(12) United States Patent
Lange et al.

(10) Patent No.: US 10,540,661 B2
(45) Date of Patent: Jan. 21, 2020

(54) INTEGRATED SERVICE SUPPORT TOOL ACROSS MULTIPLE APPLICATIONS

(71) Applicant: SAP SE, Walldorf (DE)

(72) Inventors: Stephan Lange, St. Leon-Rot (DE); Josef Schmidt, Bad Schnoenborn (DE); Lars Riecke, Malsch (DE); Cornelia Kinateder, Schwetzingen (DE); Normen Rosch, Heidelberg (DE); Ioannis Grammatikakis, Maxdorf (DE)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 15/440,811

(22) Filed: Feb. 23, 2017

(65) Prior Publication Data

US 2017/0330195 A1 Nov. 16, 2017

Related U.S. Application Data

(60) Provisional application No. 62/335,888, filed on May 13, 2016, provisional application No. 62/335,892, filed on May 13, 2016, provisional application No. 62/335,895, filed on May 13, 2016, provisional application No. 62/335,897, filed on May 13, 2016, provisional application No. 62/355,899, filed on May 13, 2016, provisional application No. 62/335,879, filed on May 13, 2016, provisional application No. 62/335,883, filed on May 13, 2016, provisional application No. 62/335,886, filed on May 13, 2016,
(Continued)

(51) Int. Cl.
*G06F 3/0482* (2013.01)
*G06Q 30/00* (2012.01)
*G06F 3/0488* (2013.01)

(52) U.S. Cl.
CPC ......... *G06Q 30/016* (2013.01); *G06F 3/0482* (2013.01); *G06F 3/0488* (2013.01)

(58) Field of Classification Search
None
See application file for complete search history.

(56) References Cited

U.S. PATENT DOCUMENTS 7,685,268 B2   3/2010   Brunswig et al.
7,757,208 B2   7/2010   Degenkolb et al.
7,890,959 B2   2/2011   Brunswig et al.
(Continued)

*Primary Examiner* — Wilson Lee
(74) *Attorney, Agent, or Firm* — Fish & Richardson P.C.

(57) ABSTRACT

A system for an integrated support interface across multiple different software applications includes an integrated support user interface, an application connector and a first support integration module. The integrated support user interface includes received user input. The application connector interfaces with multiple different software applications and receives from at least one of the software applications an application context, a user role and a system context. The first support integration module maps existing received user input to at least one support ticket and enables a chat with a user operating on an internal support system and enables a search of a customer support system for information related to the support ticket, the application context, the user role and the system context for display of results from the customer support system on the integrated support user interface. The integrated support user interface displays the results.

18 Claims, 25 Drawing Sheets

Related U.S. Application Data provisional application No. 62/335,887, filed on May 13, 2016.

(56) References Cited

U.S. PATENT DOCUMENTS

| | | | |
|---|---|---|---|
| 8,452,722 B2 | 5/2013 | Naeve et al. | |
| 8,510,373 B2 | 8/2013 | Demant et al. | |
| 8,516,364 B2 | 8/2013 | Demant et al. | |
| 8,544,027 B2 | 9/2013 | Demant et al. | |
| 8,555,249 B2 | 10/2013 | Demant et al. | |
| 8,589,883 B2 | 11/2013 | Demant et al. | |
| 8,694,544 B2 | 4/2014 | Demant et al. | |
| 8,881,056 B2 | 11/2014 | Demant et al. | |
| 8,930,441 B2 | 1/2015 | Demant et al. | |
| 9,244,697 B2 | 1/2016 | Schlarb et al. | |
| 9,491,238 B2 | 11/2016 | Demant et al. | |
| 9,600,805 B2 | 3/2017 | Lange et al. | |
| 10,176,239 B2* | 1/2019 | Rubinger | G06Q 10/20 |
| 2003/0233351 A1 | 12/2003 | Naeve et al. | |
| 2004/0064351 A1* | 4/2004 | Mikurak | G06Q 10/087 705/22 |
| 2010/0001834 A1 | 1/2010 | Brunswig | |
| 2010/0088391 A1 | 4/2010 | Brunswig et al. | |
| 2012/0023421 A1 | 1/2012 | Demant et al. | |
| 2012/0030664 A1 | 2/2012 | Demant et al. | |
| 2012/0054602 A1 | 3/2012 | Demant et al. | |
| 2012/0102406 A1 | 4/2012 | Demant et al. | |
| 2012/0102414 A1 | 4/2012 | Demant et al. | |
| 2012/0166983 A1 | 6/2012 | Demant et al. | |
| 2013/0268260 A1* | 10/2013 | Lundberg | G06F 17/28 704/8 |
| 2014/0081953 A1* | 3/2014 | Ingram | G06Q 10/10 707/722 |
| 2015/0220888 A1* | 8/2015 | Iyer | G06Q 10/1095 705/7.19 |
| 2015/0310446 A1* | 10/2015 | Tuchman | G06Q 30/016 705/304 |
| 2017/0185255 A1 | 6/2017 | Brunswig et al. | |
| 2017/0329466 A1 | 11/2017 | Krenkler et al. | |
| 2017/0329468 A1 | 11/2017 | Schon et al. | |
| 2017/0329479 A1 | 11/2017 | Rauschenbach et al. | |
| 2017/0329500 A1 | 11/2017 | Grammatikakis et al. | |
| 2017/0329505 A1 | 11/2017 | Richter et al. | |
| 2017/0329580 A1 | 11/2017 | Jann et al. | |
| 2017/0329581 A1 | 11/2017 | Jann et al. | |
| 2017/0331915 A1 | 11/2017 | Jann et al. | |
| 2018/0004543 A1 | 1/2018 | Grammatikakis et al. | |
| 2018/0210622 A1 | 7/2018 | Back et al. | |
| 2018/0210717 A1 | 7/2018 | Back et al. | |

* cited by examiner

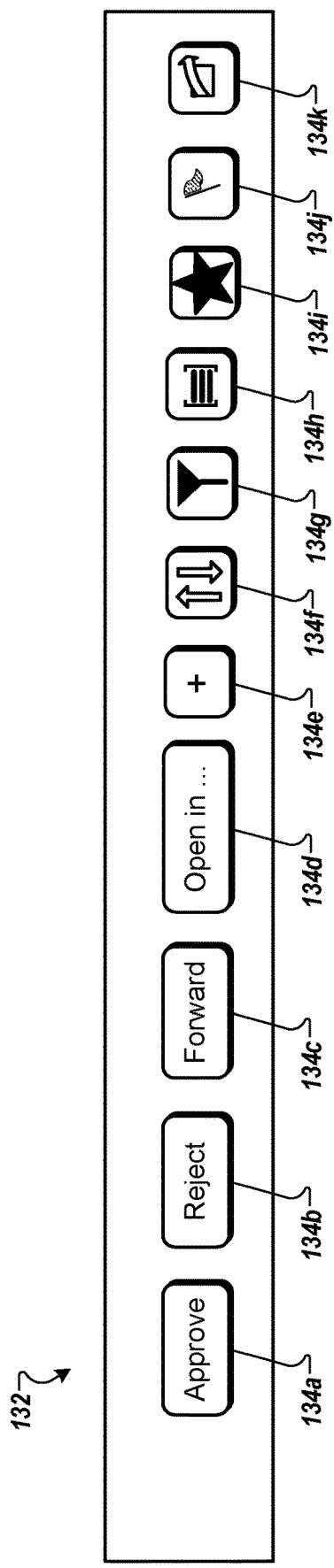

INTEGRATED SERVICE SUPPORT TOOL ACROSS MULTIPLE APPLICATIONS

CROSS-REFERENCE TO RELATED APPLICATIONS

This application claims priority to and the benefit of U.S. Provisional Application No. 62/335,888, filed May 13, 2016, U.S. Provisional Application No. 62/335,892, filed May 13, 2016, U.S. Provisional Application No. 62/335,895, filed May 13, 2016, U.S. Provisional Application No. 62/335,897, filed May 13, 2016, U.S. Provisional Application No. 62/335,899, filed May 13, 2016, U.S. Provisional Application No. 62/335,879, filed May 13, 2016, U.S. Provisional Application No. 62/335,883, filed May 13, 2016, U.S. Provisional Application No. 62/335,886, filed May 13, 2016 and U.S. Provisional Application No. 62/335,887, filed May 13, 2016, each of which is incorporated by reference in its entirety.

TECHNICAL FIELD

This description relates to an integrated service support tool across multiple applications.

BACKGROUND

End users of software applications may encounter an issue with one or more of the software applications and require support and assistance to resolve the issue. For example, in an enterprise context, an end user may use multiple, diverse software applications as part of their work experience. When an issue is encountered in one or more of the software applications, the end user may require support and assistance to resolve the issue(s). For many reasons, it may be desirable for the end user to have a common experience with respect to the needed support and assistance across the multiple, diverse software applications.

SUMMARY

According to one general aspect, a system for an integrated support interface across multiple different software applications includes an integrated support user interface, an application connector and a first support integration module. The integrated support user interface includes received user input. The application connector interfaces with multiple different software applications and receives from at least one of the software applications an application context, a user role and a system context. The first support integration module maps existing received user input to at least one support ticket and enables a chat with a user operating on an internal support system and enables a search of a customer support system for information related to the support ticket, the application context, the user role and the system context for display of results from the customer support system on the integrated support user interface. The integrated support user interface displays the results.

Implementations may include one or more of the following features. For example, the system may further include a second support integration module that is configured to connect to an external support system that differs from the internal support system and to map the at least one support ticket and the chat with the user operating on the internal support system to the external support system. The application connector may be configured to enable the plurality of multiple different software applications to register with and connect to the integrated support user interface. The integrated support user interface may include a floating window that hovers over a window for the at least one of the software applications. The second support integration module may be configured to receive user input to deselect information from the at least one support ticket prior to mapping the at least one support ticket to the external support system. The plurality of multiple different software applications may all be run by a same end user. The user input may include a collection data structure, containing one or more items, from a set of collection data structures. The user input may further include chats.

In another general aspect, a computer-implemented method for an integrated support interface across multiple different software applications includes executing instructions stored on a non-transitory computer-readable storage medium. The method includes receiving user input from the integrated support user interface and interfacing with a plurality of multiple different software applications and receiving from at least one of the software applications an application context, a user role and a system context. The method includes mapping existing received user input to at least one support ticket and enabling a chat with a user operating on an internal support system and enabling a search of a customer support system for information related to the support ticket, the application context, the user role and the system context for display of results from the customer support system on the integrated support user interface. The results are displayed on the integrated support user interface.

Implementations may include one or more of the following features. For example, the method may further include connecting to an external support system that differs from the internal support system and mapping the at least one support ticket and the chat with the user operating on the internal support system to the external support system. The method may further include enabling the plurality of multiple different software applications to register with and connect to the integrated support user interface. The integrated support user interface may include a floating window that hovers over a window for the at least one of the software applications.

The method may further include receiving user input to deselect information from the at least one support ticket prior to mapping the at least one support ticket to the external support system. The plurality of multiple different software applications may all be run by a same end user. The user input may include a collection data structure, containing one or more items, from a set of collection data structures. The user input may further include chats.

In another general aspect, a computer program for an integrated support interface across multiple different software applications is tangibly embodied on a non-transitory computer-readable storage medium and includes instructions that, when executed by at least one computing device, are configured to cause the at least one computing device to receive user input from the integrated support user interface and interface with a plurality of multiple different software applications and receive from at least one of the software applications an application context, a user role and a system context. The executed instructions cause the at least one computing device to map existing received user input to at least one support ticket and enable a chat with a user operating on an internal support system and enable a search of a customer support system for information related to the support ticket, the application context, the user role and the system context for display of results from the customer support system on the integrated support user interface. The results are displayed on the integrated support user interface.

Implementations may include one or more one or more of the following features. For example, the computer program product may further include instructions that, when executed, cause the at least one computing device to connect to an external support system that differs from the internal support system and map the at least one support ticket and the chat with the user operating on the internal support system to the external support system. The integrated support user interface may include a floating window that hovers over a window for the at least one of the software applications. The computer program product may further include instructions that, when executed, cause the at least one computing device to receive user input to deselect information from the at least one support ticket prior to mapping the at least one support ticket to the external support system.

The details of one or more implementations are set forth in the accompanying drawings and the description below. Other features will be apparent from the description and drawings, and from the claims.

BRIEF DESCRIPTION OF THE DRAWINGS

FIG. 1F is an illustration showing an example toolbar.

FIG. 11A is an example screen shot of a CoPilot window implemented as a docked window.

FIG. 11B is an example screen shot of a CoPilot window implemented as a floating window.

FIG. 13 is a block diagram of a system for

DETAILED DESCRIPTION

This document describes systems and techniques to enable an integrated support interface used for service support, assistance, help, search and other functions across multiple, different software applications. The integrated support interface may be implemented and referred to as CoPilot, which includes many additional features, as described herein. CoPilot is enhanced in a way that it can be positioned as the dedicated frontend for business users who need support, internally and/or externally, and the gateway for key users at the customer who need to get in touch with external support, i.e. reporting of incidents to external support.

The improvements to CoPilot include allowing connecting CoPilot to multiple different software application, such as, products from one vendor (e.g., SAP products) that are used at the customer including cloud-based and on-premise installed software applications. CoPilot can access application and user context information in order to provide end users with help in the context of applications of all the relevant different software applications.

Figure 13:
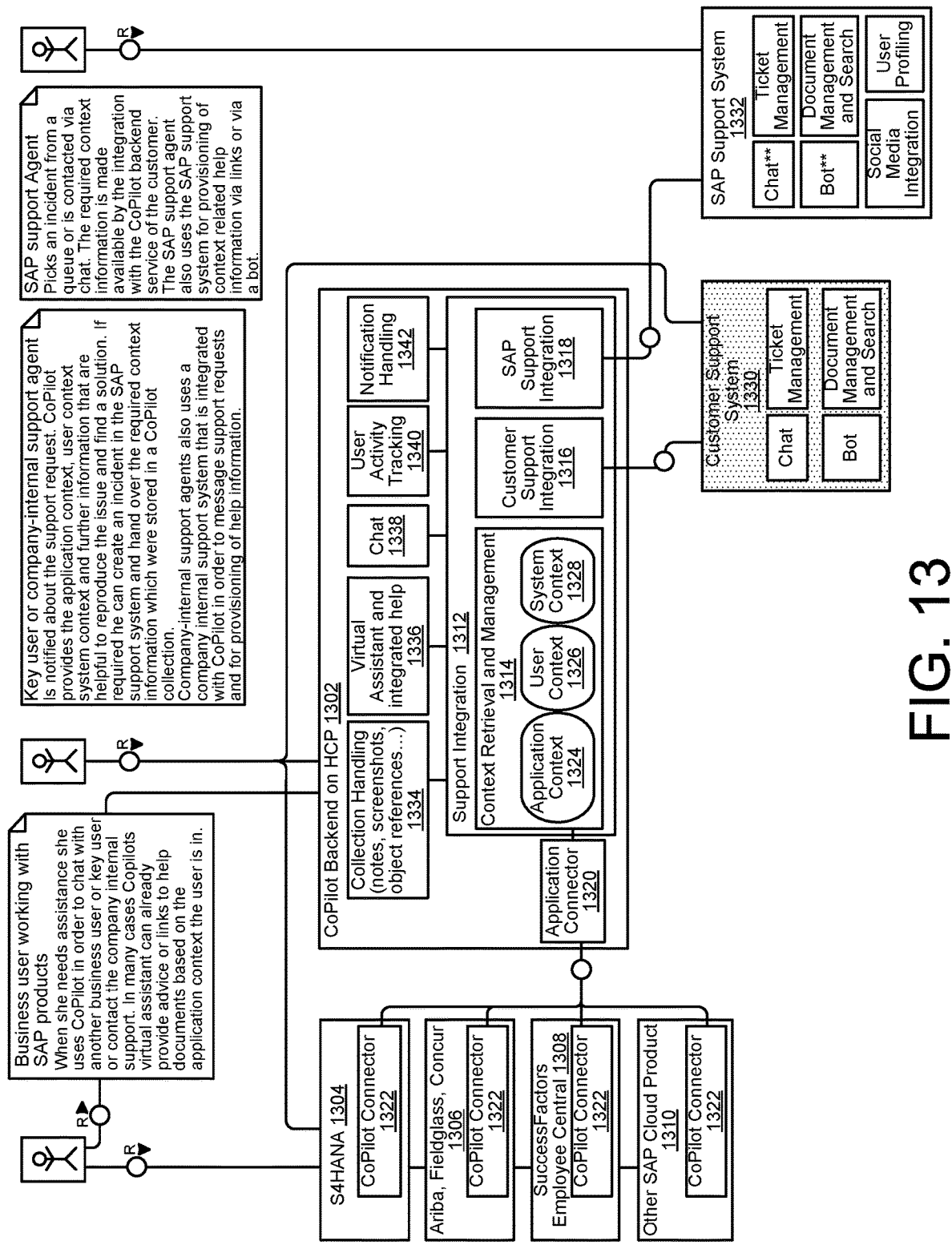

Internal and external support users and other can make help documents and search capabilities for help documents available in the context of the applications into CoPilot. Help documents may reside in company owned document server, but it may also be external resources such as videos or content of social networks or communities. The system allows customers and external resources to plug in intelligent bots that give end users advice in the context of the application the user is running and the data the user is working with. The system allows customers to retrieve company-internal support using CoPilot, especially meet the requirements of Shared Services Center organizations who support end users in the company. The system also allows customers to chat with external support agents who are assigned to the conversation in the context of the application, the time zone and the preferred language of the user, as well as other potential contexts. FIG. 13 discussed below illustrates an example block diagram architecture.

Enterprise transactional applications can evolve from large monolithic on-premise software deployments into multiple (e.g., hundreds of, thousands of) small, componentized applications that can execute (run) on various types of computing devices and network platforms. For example, the fifth version of Hypertext Markup Language (HTML5) can be used as a basis for structuring and presenting an application platform that includes a grid matrix-style home screen or dashboard-like user interface. The use of HTML5 can provide an improved user experience, can reduce a user interface complexity, and may increase user productivity across multiple types of computing devices. The computing devices can include, but are not limited to, desktop computers and mobile computing devices such as laptop computers, tablet computers, notebook computers, personal digital assistants (PDAs), smartphones, mobile phones, smart watches, etc.).

In some cases, the grid matrix-style home screen or dashboard-like user interface allows a user to open and access a selected application. In some cases, the grid matrix-style home screen or dashboard-like user interface allows a user to access content within an application. These user interfaces can present user experience (UX) and user interface (UI) shortcomings while attempting to provide optimized usability and user-centric business functionalities related to transactional tasks.

For example, users may need to navigate back and forth between multiple screens that can include home screens, application instances, and drill downs, in order to perform various transactional tasks to make viable business decisions. The user may need to navigate back and forth between multiple screens when viewing related data between various applications.

For example, applications and application instances may not interoperate with each other. Because of this, user navigation and operations may not be minimized. Applications may not readily access relative content without first needing to open an application instance and then perform numerous navigations.

In order to improve a user experience (UX), a user interface can be implemented to intuitively propose relative context or intent to a user. A user interface can be implemented to conform to, recognize, and facilitate ways in which a user may personally work. A user interface can be implemented to help a user remember important tasks. The use of such a "smart" user interface can help a user easily manage and keep track of the context of current tasks and activities when carrying out transactional tasks.

A shortcoming of a UX and a UI can be a lack of relative business contexts related to user roles and expertise that can empower employees to do their job better, faster, and in a more deliberate way. Providing a user with a way to personalize an experience of the user based on a role requirement of the user can result in a better overall user experience. For example, the personalization can result in a UI automatically providing proposals for transactional tasks that the user may need to see. The proposals can be provided at a time when the user wants to see the proposal and on a computing device chosen by the user. The proposals can be provided to the user as a result of a single click or gesture input to the user interface by the user. The UI can be considered a central interface that can provide a user with the ability to communicate, collaborate, initiate, and/or respond to colleagues, managers, and customers without leaving the context of their current activity or application.

Alternatively, a user may have to navigating through multiple applications and user interfaces. A user may easily lose a context of a current task or activity while having to navigate through user interfaces provided in a multiple application environment for an enterprise. The loss of context can affect the ability of the user to effectively carryout a transactional task. In addition, navigating through user interfaces provided in a multiple application environment may not allow a user to readily view, at a glance, live data that may be relevant to personal and professional daily activities, responsibilities and organizational accountabilities of the user. The user may not be provided with a way to efficiently manage hundreds (or thousands) of applications associated with transactional workflows in the enterprise.

Enterprise applications that are associated with transactional workflows in an enterprise can be implemented using a software development technology or foundation (e.g., HTML5/CSS/JS technology) in a particular UI framework (e.g., SAPUI5) in order to provide a beneficial UX and UI.

The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

Figure 1A:
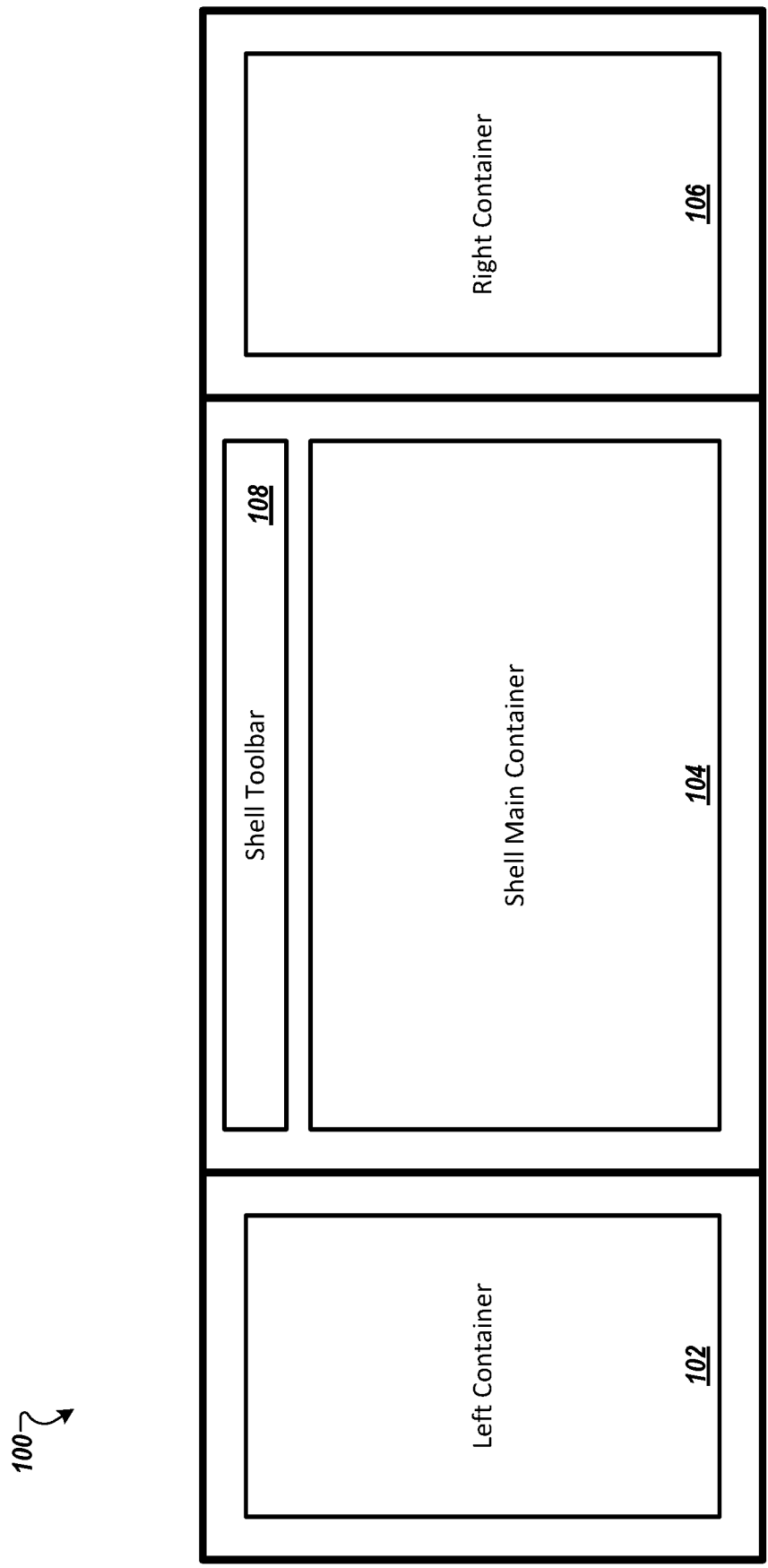
FIG. 1A is an illustration of a user interface entry point (a viewport) for a particular user experience.

FIG. 1A is an illustration of a UI entry point (a viewport 100) for a particular UX. The viewport 100 can be a single-screen view partitioned into multiple (e.g., three) multifunctional screen areas (e.g., a left screen area (left container 102, a center screen area (shell main container 104), and a right screen area (right container 106) for display in a display area (on a display device) included in a computing device. The viewport 100 can include a shell toolbar 108. The shell toolbar 108 can include a global search and other services, which are available to a user across all enterprise applications.

The shell main container 104 can display information for use as a main workspace for the UX. In some implementations, multiple different screens can be displayed in the shell main container 104. For example, a login screen, a launchpad screen, and an overview page can alternatively be displayed in the shell main container 104. The viewport 100 can provide a user with a screen orientation that can allow the user access to application information. The viewport 100 can provide the user with a UX and UI the includes the business functionalities and enterprise application-to-application navigations needed by the user without disrupting a context of a current task of the user.

Figure 1B:
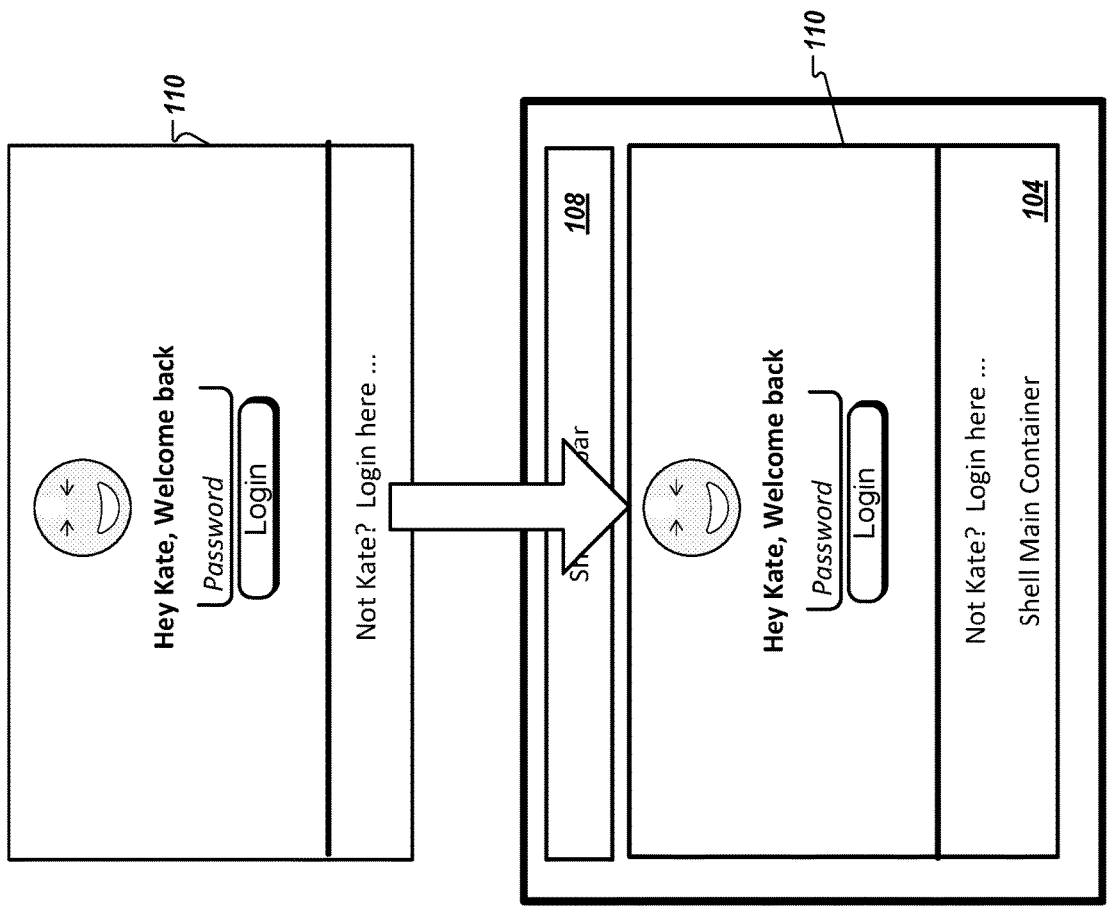
FIG. 1B is an illustration showing an example login screen displayed in a shell main container.

FIG. 1B is an illustration showing an example login screen 110 displayed in the shell main container 104. The login screen 110 provides a UI that allows a user to enter credentials in order to log into and begin a personalized and customized UX. In the example shown in FIG. 1B, the login screen 110 appears to drop into the shell main container 104 from a virtual extension area located along a top of a display area. In some implementations, the virtual extension area can be placed along the bottom of the display area. In some implementations, the virtual extension area can be placed to the left and/or the right of the display area.

Figure 1C:
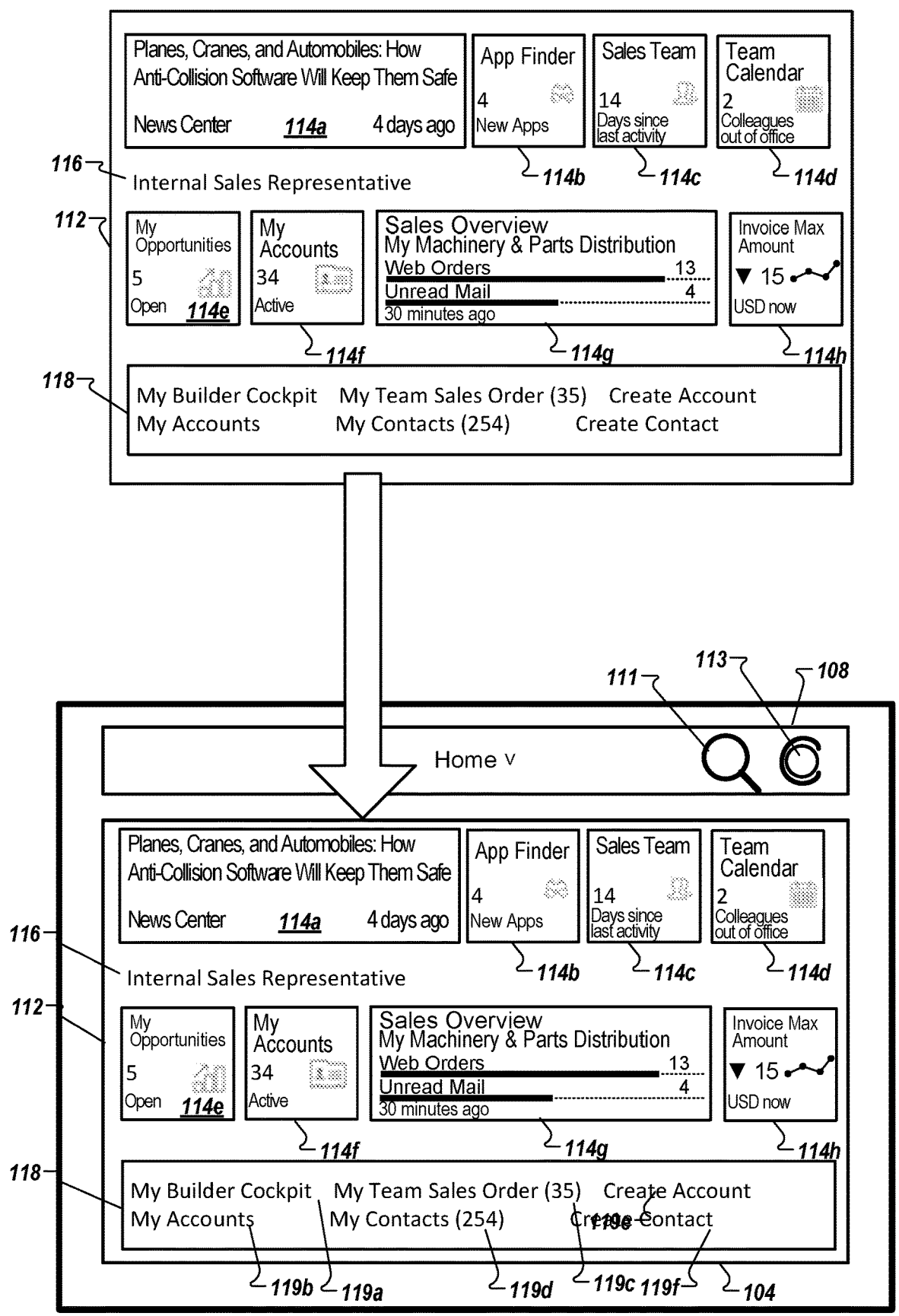
FIG. 1C is an illustration showing an example launchpad displayed in a shell main container.

FIG. 1C is an illustration showing an example launchpad 112 displayed in the shell main container 104. The launchpad 112 can be a web-based entry point (or homepage) for enterprise applications that can execute (run) across multiple platforms and computing devices. In the example shown in FIG. 1C, the launchpad 112 appears to drop into the shell main container 104 from the top of a display area. In some implementations, the virtual extension area can be placed along the bottom of the display area. In some implementations, the virtual extension area can be placed to the left and/or the right of the display area.

The launchpad 112 can serve as a bracket around (or a base for) a set (or group) of enterprise applications, providing a single point of entry for the set of enterprise applications. In the example shown in FIG. 1C, the launchpad 112 presents (displays on a screen of a computing device of a user) each application represented by a tile. A tile can be a container that represents the application. Each tile can display different types of content. A user can interact with each tile to navigate to the specific enterprise application associated with the tile. In addition, when designing a tile to represent a specific application, a programmer can assign a tile to a specific user or group of users. The launchpad 112 can provide one or more services. The one or more services can include, but are not limited to, application-to-application navigation, personalization, role-based application assignments, search, and incident creation.

The launchpad 112 can be a role based, personalized, real-time and contextual aggregation point for business applications and analytics. The launchpad 112 can run (execute) on multiple computing devices including, but not limited to, desktop computers and mobile computing devices such as laptop computers, tablet computers, notebook computers, personal digital assistants (PDAs), smartphones, mobile phones, smart watches, etc.). In addition, the launchpad 112 can be deployed on multiple platforms (e.g., Linux, Windows, Windows Phone, MAC®, iOS®, OS X®, Android®, etc.).

The launchpad 112 includes tiles 114a-h. Each tile can display different types of content. For example, tile 114a can be a news and feeds tile that can enhance collaboration by providing a user with information about the enterprise. The tiles 114a-h can be individually color-coded. A color can represent a particular role (e.g., finance, human resources, supply chain management (SCM), customer relationship management (CRM), etc.). The tiles 114a-h can be associated with a group 116. Tile 114f can be a key performance indicator (KPI) tile. Tile 114b can be a basic launch tile. Tile 114d can be a monitoring tile. Tile 114g can display a comparison chart for specific content.

The launchpad 112 includes a link list area 118 that includes links 119a-f. The link list area 118 is an area on the launchpad 112 that can provide links to enterprise applications represented by the tiles 114a-h. For example, a user can select and drag a tile from the tile area on the launchpad 112 into the link list area 118 to create a link to the application associated with (represented by) the tile. In some implementations, the launchpad 112 can include a footer toolbar (e.g., footer toolbar 132 as shown in FIG. 1F). In some implementations, the footer toolbar can appear to float over the content displayed in the launchpad 112.

In some implementations, the shell toolbar 108 can display a search icon 111 and a CoPilot launch icon 113. A user can select (click on) the CoPilot launch icon 113 to launch a CoPilot UI. A CoPilot UI will be described in more detail with reference to FIG. 1I.

Figure 1D:
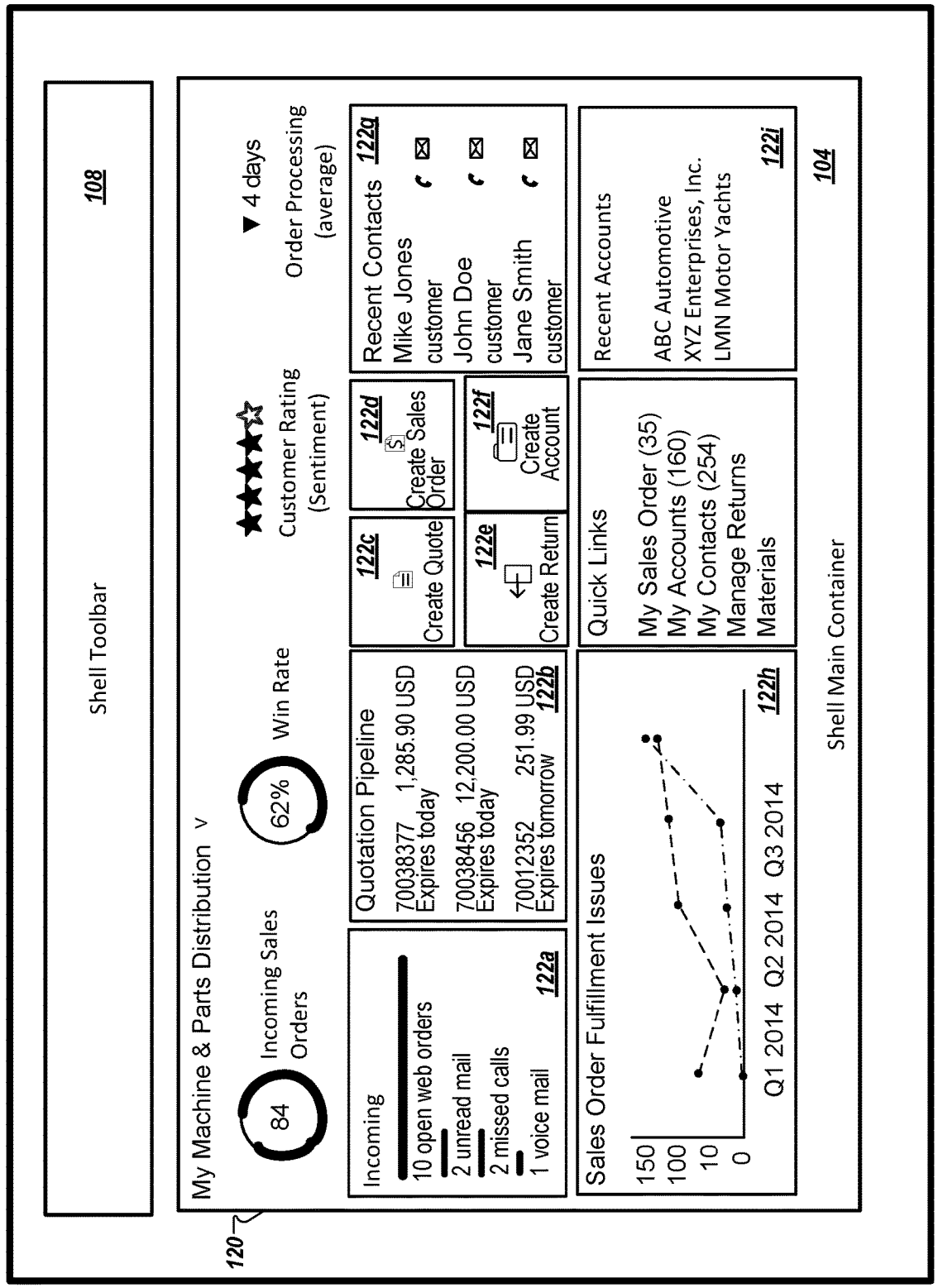
FIG. 1D is an illustration showing an example active application screen (an overview page) displayed in a shell main container.

FIG. 1D is an illustration showing an example active application screen (overview page 120) displayed in the shell main container 104. The enterprise applications that can be accessed by a user by way of the launchpad 112 and then subsequently displayed in an active application screen (e.g., the overview page 120) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

The overview page 120 can visualize all of the information a user may need for a specific business context (business domain) on a single page or screen. The information can be displayed in one or more variable content packages (VCPs) or cards 122a-i. Each card can be a container of content for organizing large amounts of information on an equal plane within the overview page 120. In some implementations, a user can rearrange the position of the cards 122a-i on the overview page 120. In some implementations, a user define, add, or delete cards included in the overview page 120.

An overview page (e.g., the overview page 120) can be a selectable application (e.g., from the launchpad 112) providing an integrated gateway into enterprise applications and application content included in the launchpad 112. The UI of the overview page (e.g., the overview page 120) can provide a user with a visual summary of data, links, actions, and content that are relevant to a business domain of expertise of a user and relevant to a selected role of the user within the domain. The visual summary can be presented in one or more cards (e.g., the cards 122a-i) that display live content to a user at-a-glance without the user having to open multiple applications and perform multiple drill downs through application content to find and present the content.

In some implementations, the overview page 120 can include a footer toolbar (e.g., footer toolbar 132 as shown in FIG. 1F). In some implementations, the footer toolbar can appear to float over the content displayed in the overview page 120.

In some implementations, an enterprise system can determine content displayed on an overview page (e.g., the overview page 120). In addition or in the alternative, a selection of one or more business domains and one or more roles of a user in the business or enterprise can determine content displayed on an overview page (e.g., the overview page 120). In some implementations, a user can make the selection using a settings UI included in a launchpad (e.g., the launchpad 112). In some implementations, a user can select one or more business domains and/or one or more roles of the user in the enterprise by way of an overview page (e.g., the overview page 120). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122a-i) included in a UI of an overview page (e.g., the overview page 120) and the display of content included in each card. The personalization can enhance the workplace productivity of the user.

Figure 1E:
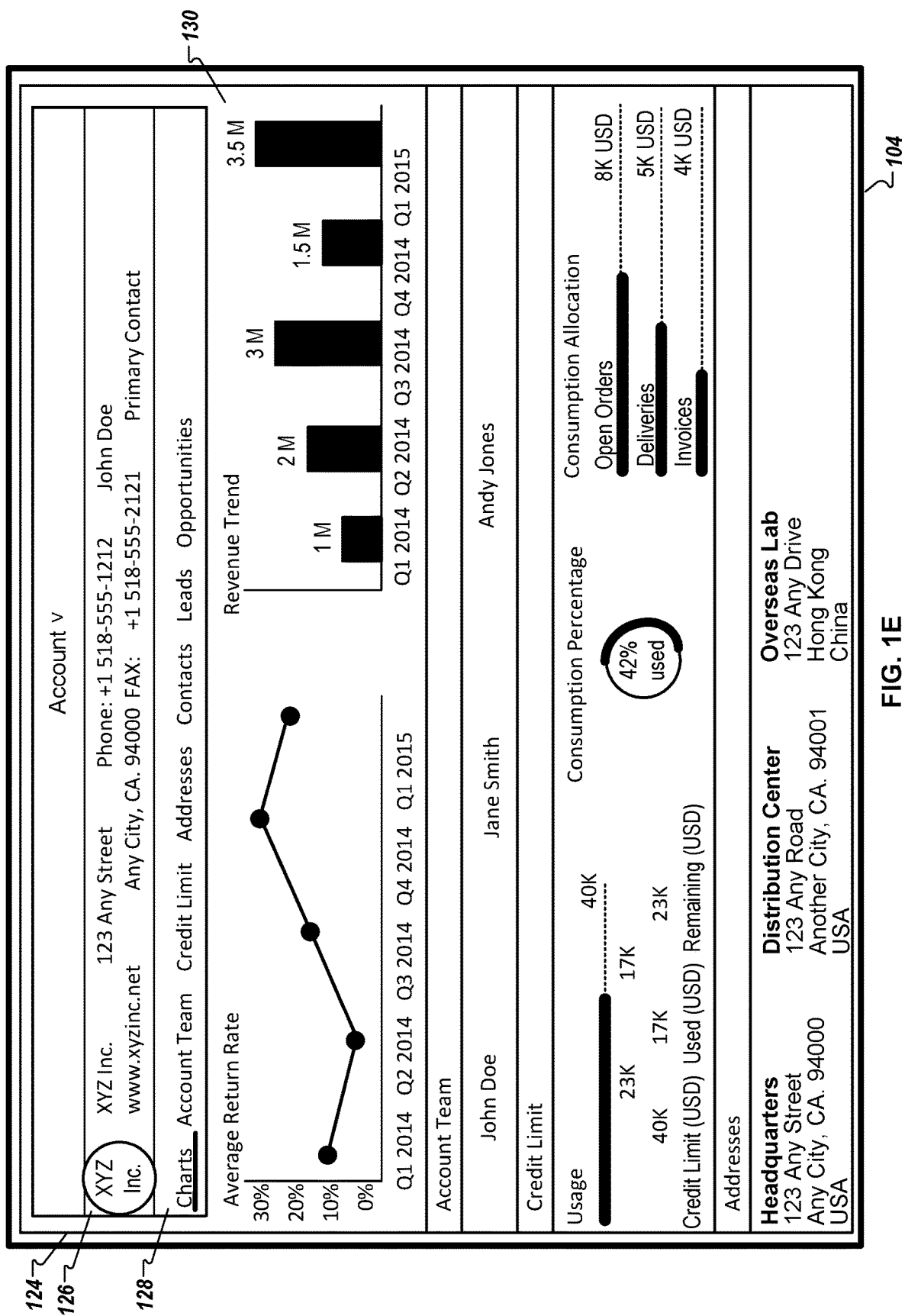
FIG. 1E is an illustration showing an example object page displayed in a shell main container.

FIG. 1E is an illustration showing an example object page (object page 124) displayed in the shell main container 104. An object page can be a floor-plan used to represent objects in a UI. An object page can be used to display, create, or edit an object. An object can represent a business entity (e.g., a customer, a sales order, a product, an account, etc.). Enterprise applications that reflect a specific scenario (e.g., a sales order, am account status) can be bundled using an object. The object page can include a header area 126, a navigation area 128, a content area 130, and, in some implementations, a footer toolbar (e.g., footer toolbar 132 as shown in FIG. 1F). In some implementations, the footer toolbar can appear to float over the content displayed in the object page 124. For example, referring to FIG. 1C, a user can select the tile 114*f* and an object page can be displayed to the user.

FIG. 1F is an illustration showing an example a footer toolbar (e.g., footer toolbar 132). In some implementations, referring to FIG. 1A, the footer toolbar 132 can appear at the bottom of a screen displayed in the shell main container 104, the left container 102, and/or the right container 106. For example, as described herein with reference to FIGS. 1C-E, a footer toolbar (e.g., the footer toolbar 132) can be displayed at the bottom of the launchpad 112, the overview page 120, and the object page 124. The footer toolbar (e.g., the footer toolbar 132) can continue to appear at the bottom of the screen of the display area of the display device even as the displayed screen is scrolled. The footer toolbar (e.g., the footer toolbar 132) can appear to hover over or float over the content being displayed on the screen. The footer toolbar 132 can include buttons or controls 134*a-k*. The controls 134*a-k* can be selected by a user in order to perform one or more actions that can impact content included on the page being displayed on the screen. The controls 134*a-k* are examples of controls that can be included in a footer toolbar. In some implementations, the controls can be different, fewer than, or more that the controls 134*a-k*. The type and number of controls included in a footer toolbar can be based on the type of page being displayed and/or the content being displayed in the page.

Figure 1G:
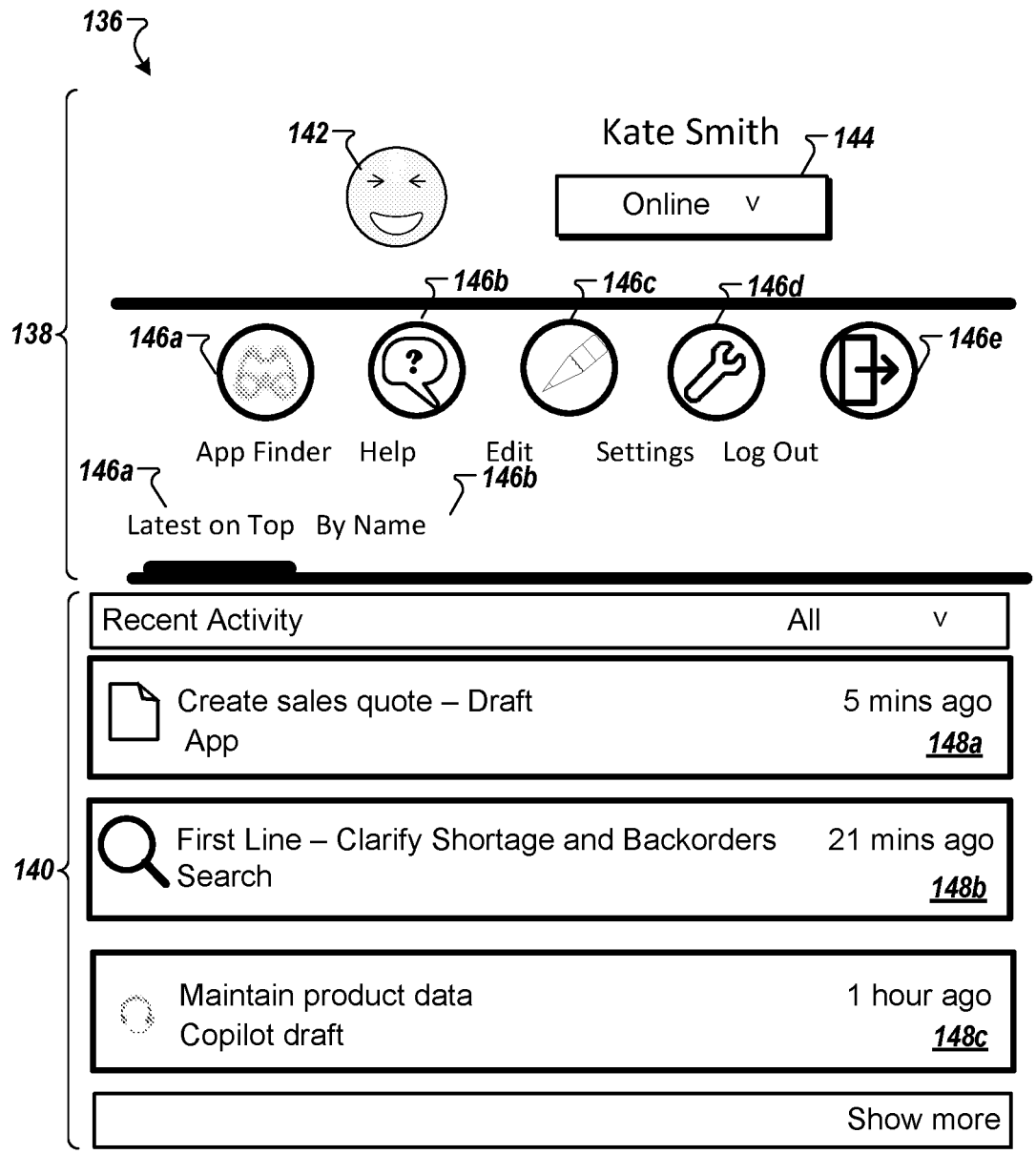
FIG. 1G is an illustration showing an example me area that can be displayed in a left container.

FIG. 1G is an illustration showing an example me area (e.g., me area 136) that can be displayed in the left container 102. In some implementations, the me area 136 can be displayed in the right container 106. The me area 136 includes an upper section 138 and a lower section 140. The upper section 138 includes a user icon 142. Selecting (clicking on) the user icon 142 can provide a user profile. A dropdown indicator button 144 displays a status of the user and, if selected, a user can logout of an application. The upper section 138 includes navigation targets 146*a-e*. Selection of (clicking on) a navigation target by a user triggers a corresponding functionality (e.g., an application) associated with a navigation target. The me area 136 can provide various generalized functionalities as they are related to a user.

The upper section 138 can include sort selections 146*a-b*. A user can select (click on) a sort selection (e.g., one of the sort selections 146*a-b*) to determine how the listing of the recent activities included in the lower section 140 will be sorted and displayed.

The lower section 140 of the me area 136 includes a list of recent activities 148*a-c*. The recent activities 148*a-c* can include links 156*a-c*, respectively, that when selected (clicked on) by a user can navigate the user to back to the shell main container 104, opening an application (or function) that corresponds to the link in the shell main container 104. Recent activity items can include, but are not limited to, enterprise applications, triggered searches, co-pilot collections, and co-pilot drafts.

Figure 1H:
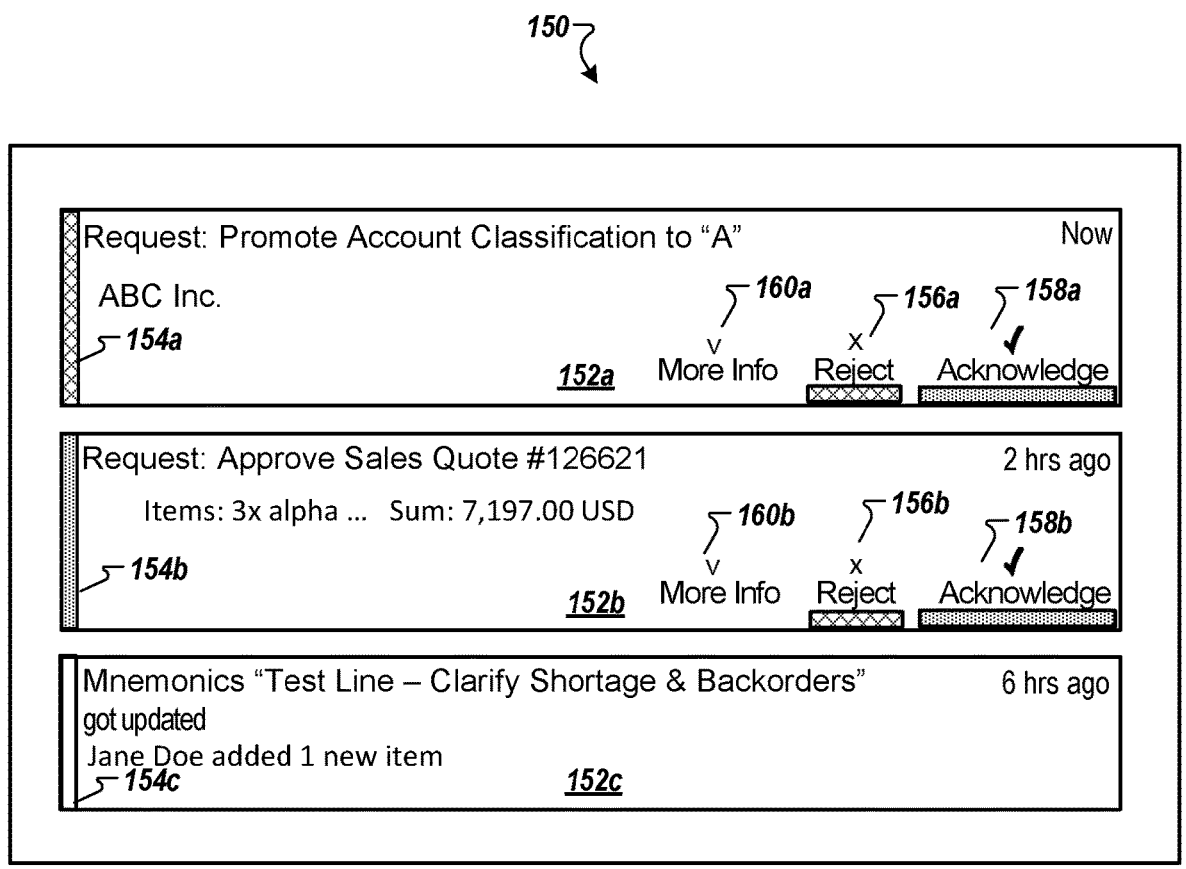
FIG. 1H is an illustration showing an example notification area that can be displayed in a right container.

FIG. 1H is an illustration showing an example notification area (e.g., notification area 150) that can be displayed in the right container 106. In some implementations, the notification area 150 can be displayed in the left container 102. The notification area 150 includes notifications 152 *a-c*. A user interacting with the UI for the notification area 150 can take immediate action on a notification. A notification item (e.g., notifications 152*a-c*) can have an indicator (e.g., notification indicators 154*a-c*) that can indicate the status of the notification. For example, a notification indicator can be color coded to indicate a particular status of the notification.

A user can reject a notification by selecting (clicking on) a reject selection (e.g., a reject selection 156*a-b*). For example, a user can reject the notification 152*a* by selecting (clicking on) the reject selection 156*a*. The rejection of the notification 152*a* (the notification status) can be indicated by content included in (e.g., a color of) a notification indicator 154*a*. A user can acknowledge a notification by selecting (clicking on) an acknowledge selection (e.g., a acknowledge selection 158*a-b*). For example, a user can acknowledge the notification 152*b* by selecting (clicking on) the acknowledge selection 158*b*. The acknowledgement of the notification 152*b* (the notification status) can be indicated by content included in (e.g., a color of) a notification indicator 154*b*.

A user can drill down into a relevant application by selecting (clicking on) a more info selection (e.g., a more info selection 160*a-b*). In some cases, a user may contact someone directly in response to a notification.

Figure 1I:
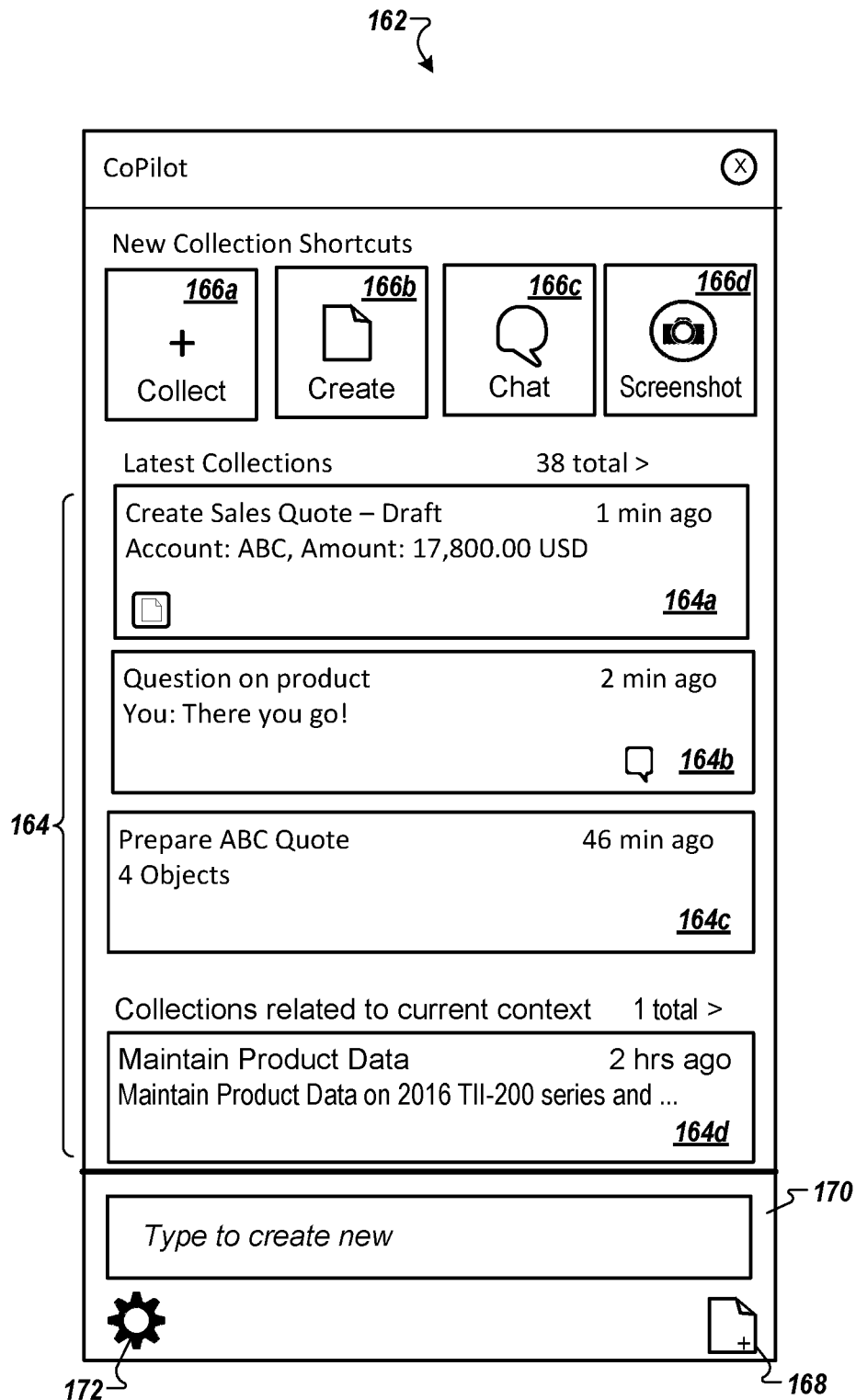
FIG. 1I is an illustration showing an example CoPilot user interface.
Figure 1J:
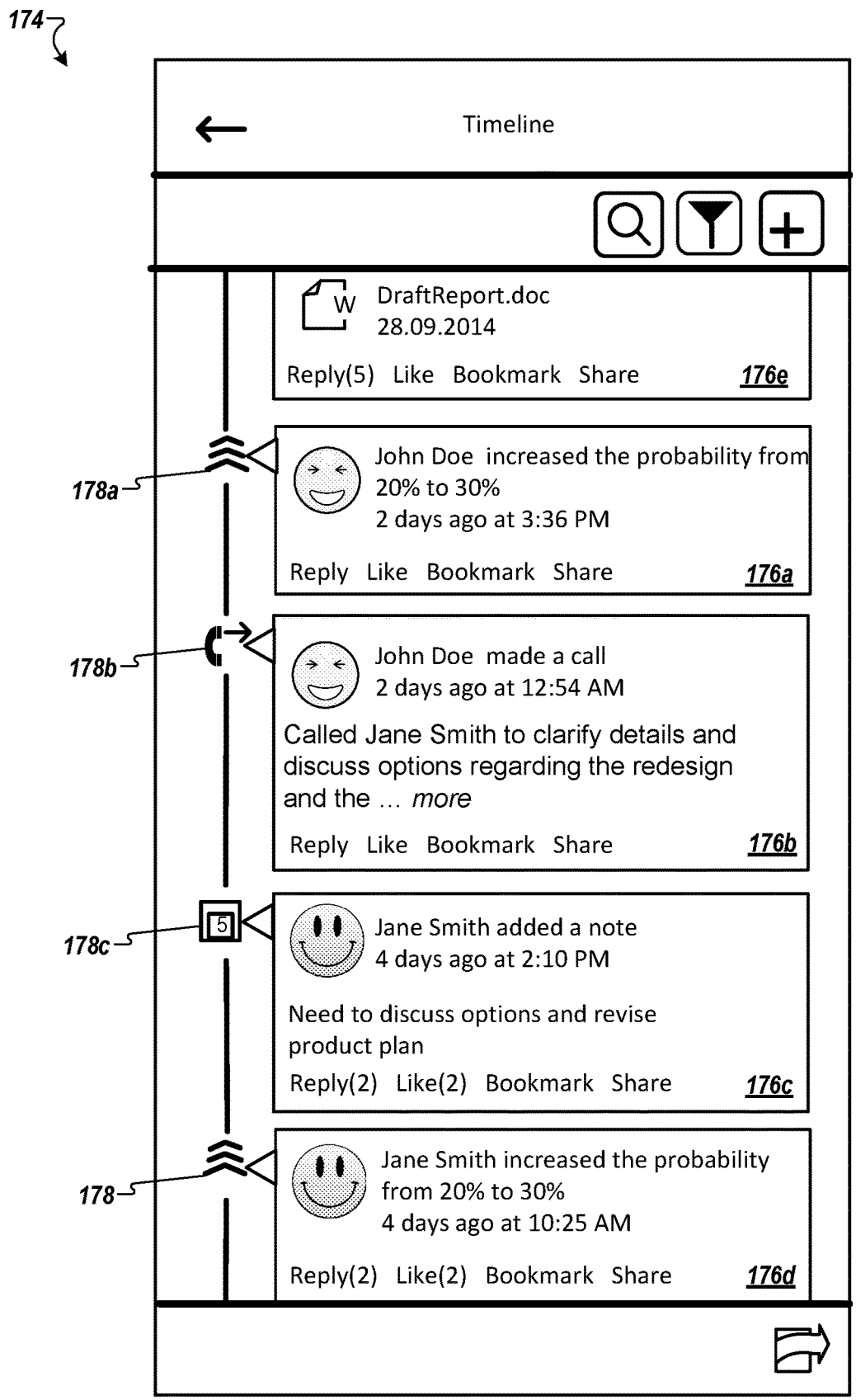
FIG. 1J is an illustration of a timeline user interface that can display timeline entries.
Figure 2:
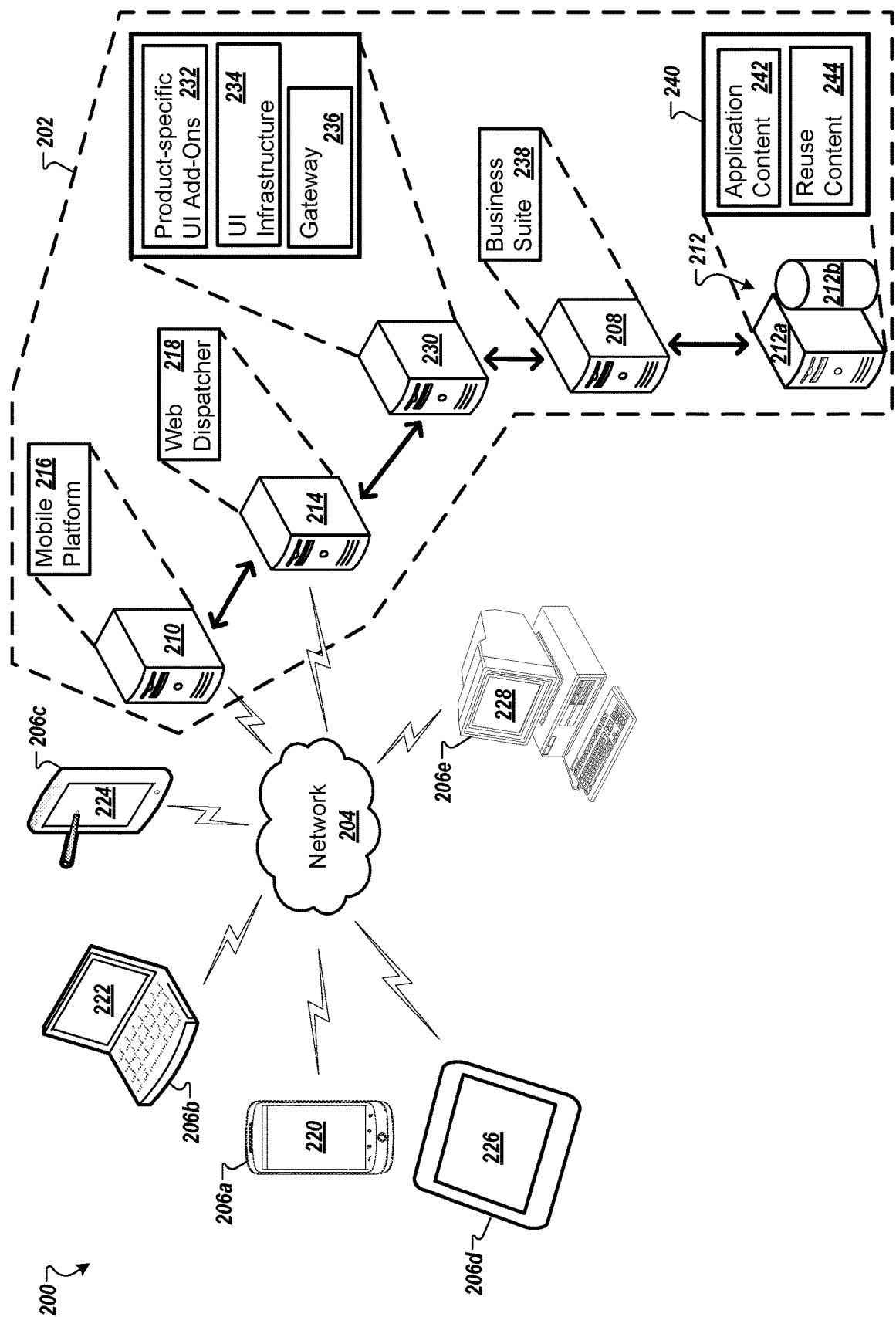
FIG. 2 is a diagram of an example system that can implement the user interfaces and user experiences described herein.

FIG. 1I is an illustration showing an example CoPilot UI (e.g., CoPilot UI 162). For example, referring to FIG. 1C, a CoPilot application can be launched from the launchpad 112 when a user selects (clicks on) the CoPilot launch icon 113. The CoPilot application can provide (generate and display) the CoPilot UI 162. In some cases, the CoPilot UI 162 can float over the UI included in the launchpad 112. As a floating UI control, the CoPilot UI 162 can be visually unobtrusive and flexible in its cross-functional omnipresent implementation across any device or application screen.

The example CoPilot UI 162 is an example CoPilot start page or start screen. The start screen (the CoPilot UI 162) can be an entry point for CoPilot functionality for an enterprise system.

The CoPilot UI 162 can provide shortcuts to different CoPilot features. For example, as shown in FIG. 1I, a collection can be represented by an entry in a collection list 164 that includes collection list entries 164*a-d*. A CoPilot collection can be a cluster of items in relation to a specific topic. For example, an item can be a note, a screenshot, a chat message, a CoPilot message, an object, or a quick create. In some implementations, the items included in the collection can be homogeneous (e.g., all of the items are of the same type). In some implementations, the items included in a collection can be non-homogeneous (e.g., the items can be of different types). Each collection list entry 164*a-d* can provide a representation of a collection that can include a title, a timestamp (e.g., last changed), a visual content summary, and a textual content preview. In some implementations, the collection list 164 can be searched and/or filtered.

For example, the selection of a CoPilot shortcut 166*a-d* can allow a user to create and navigate to a new collection with a specified intention. The selection of a CoPilot create icon 168 located in a CoPilot footer toolbar 170 can create and navigate to a new plain collection. The selection of a CoPilot settings icon 172 located in the CoPilot footer toolbar 170 can allow a user access to CoPilot settings (e.g., display a CoPilot settings UI, open a CoPilot settings application).

Aspects of the CoPilot initiative yield a dynamic, fluid, etc. digital assistant that among other things leverages Natural Language Processing (NLP), learning capabilities, etc. to provide support for seamless conversational interactions.

CoPilot entries can be living, gradually growing artifacts and software entities that can accompany a user from the identification of an issue to a solution for the issue, while providing support in the form of relevant context and actions. CoPilot entries can serve as memory aides while the CoPilot entries can incrementally evolve into valuable transactional tasks and collaborations as they mature in meaningful ways that bridge a gap between predefined application functionality and processes based on personal way of working for a user. Though the example shown in FIG. 1I describes launching the CoPilot application from the launchpad 112, referring to FIG. 1A, the CoPilot application can be launched from other screens displayed in (included in) the shell main container 104, the left container 102, and/or the right container 106.

CoPilot can reference objects in the actual Fiori application and tracks user interaction to provide a list of recently used objects. On the one hand, CoPilot can serve as data provider (sensor) for the user relevance calculation: The tracking of user interaction in CoPilot, which can be quite detailed, can serve as an important source of information. In addition, the recently annotated (NOTE) or collected (COLLECT) items may indicate currently important business objects for the user. The same applies to objects referenced in chats (CHAT). From CHAT, people related to business objects may be retrieved. On the other hand, the user may annotate situation instances (NOTE), may reference to situation instances in collections (COLLECT), or use situations as a basis for chats (CHATS). Also, situations may be used as an initiator of create activities (CREATE). The user interaction tracking used for CoPilot may be available as an independent service, which may also be used for ranking.

CoPilot entries can be made ready for users to use when communicating, collaborating, and creating actionable transactions in desktop or mobile scenarios. For example, CoPilot text entries can be analyzed for recognizing and identifying relevant text related objects. CoPilot text entries can emphasize displayed text, and a CoPilot application can recommend contextual entities for use in a current task. The CoPilot application can understand user context and can intelligently propose selections, auto-entries, and user options.

CoPilot may support among other things a dynamic, living 'sticky note' that may be associated with for example an item on a screen, an element of an application, etc. such as for example an entry in a list, a display field, a control, etc.

CoPilot is a digital doppelganger in the enterprise. It federates Fiori apps and services to help you accomplish your work, empowers you to make timely decisions or performs tasks for you. By learning individual and organizational behaviors and adjusting to them accordingly, CoPilot will be able to interact with the end user in a revolutionary way. The CoPilot will provide a GUI-less, natural interaction across apps, ready for any input modality and form factor. It will also offer functionality independent of the apps.

CoPilot is highly accessible anywhere, anytime and in any app. CoPilot always stands ready for users to communicate, collaborate, and create actionable transactions in desktop or mobile scenarios. Some examples of CoPilot types and configurations include Personal Notes, Screen Captures, Images, Chat, System Messages and Alerts, Tasks, etc. that can be organized into homogenies, (all of the same type), or heterogeneous (many different types) of contextual collections to further aid in business processes.

CoPilot entries are smart digital sticky-notes, that can be created from everywhere, from a given context or just stand-alone. They can be saved at any time in any condition, thereby working on a copilot entry can easily be halted and later on continued. A CoPilot entry is a living, gradually growing, artifact that accompanies the user on his way from issue to solution, supporting with context and actions as needed. They first serve as a memory aid but easily can be turned into or simply create different object types. As such, the CoPilot functionality is bridging the gap between pre-defined application functionality and processes and the users personal way of working. When in edit mode the CoPilot floats above the content and can be moved around the screen. While the user navigates through his application, the CoPilot will stay open across different screens and objects, unless the user decides to close it. By appearing as a floating overlay, the user does not have to leave his current context to work on a copilot entry. It shares the screen with the 'normal' content and can be moved to another position on the screen or simply be closed if the user needs to change his focus. When being created from a context the CoPilot entry will take over as much information as possible to simplify the users input process. The user still has the option to get rid of some or add additional. A CoPilot can be shared with other users in the business system. While CoPilot entries can be created from every screen, a list of the user's CoPilot entries should also be easily accessible. Contextually filtered lists of CoPilot entries can also be embedded in existing floorplans. With CoPilot the user can create collections of items. Normally these collections are created in relation to a specific topic or a certain problem, the user wants to solve with the help of CoPilot. Each collection consists primarily of a set of items and some meta information.

With SAP CoPilot "LeaH" (Live Enterprise Assistant for HANA) is introduced, which is the first true digital assistant in the enterprise supported by a next-generation user experience. It helps you to get things done at the speed of thought and makes sure you know what you need to know at the very moment you need it.

The conversational (multi-modal) user interface communicates with you using natural human language via text, gesture or voice and enables you to converse with others, within your business context. SAP CoPilot learns over time and can also give you recommendations. It starts out with pre-defined business rules and gradually learns from behavioral data and recommends next best actions to the user. Business Context Awareness offers relevant insights just when you need them based on your role, context and current business situation by recognizing business objects on your screen or within the conversation. Quick actions enable you to take immediate action based on these insights.

LeaH aims to capture a wide functional coverage with limited depth, supporting open-ended questions and enabling traditional applications with natural language input by text or voice as an alternative way to interact.

During conversations with the system, the user might need to involve other users into the conversation. CoPilot provides all the means to facilitate the conversations of the users by the possibility to add notes, screenshots, objects into the conversation. All that information is taken into account by the digital assistant to guide users to the solution of a business problem.

In summary, LeaH is low touch meaning the conversational (multi-modal) user interface communicates with you using natural human language via text, gesture or voice and enables you to converse with others, within your business context. LeaH understands the user and adapts to the user needs. LeaH includes human interaction meaning human like representation of software. The experience of interacting with the assistant will be the user experience. It will be represented by a persona with one personality, memory, and behavior. A relationship between the assistant and the human user will be established and evolved. The assistant can become a coach that explains the system ("her thoughts and reasoning"). Technical functions will be capabilities of the assistant that it will gain, just as humans learn.

LeaH provides assistance and coaching. The digital assistant represents the system, it's capabilities and implemented business logic. It will be natural for the user to expect the assistant to help him understand and use these processes. The assistant will help the user to learn complex business processes, just as a team assistant helps to do the expense report properly. The user will expect the assistant to be able to explain the reasoning and logic behind the business processes it supports and therefore help him gain deeper understanding. In all interactions, the assistant should be able to explain why it gives an answer, recommendation or proposes actions (reasoning). This way she coaches the user and helps him to understand best practices and grow in his profession. The assistant will learn common mistakes a user makes and can prevent them, compensate for weaknesses and help him improve.

LeaH guides the user along best practice. LeaH observes the user and learns new best practices and understands business situations and assists the user to assess situations and proposes solutions best on best practices. LeaH can focus on retrieving information, getting Alerts, executing light-weight tasks. LeaH includes automation through predefined rules, human-to-machine & vice versa. The system self-improves human-created rules and includes the ability to recommend follow-up actions based on best practices.

Features for LeaH include Native Copilot apps are available for download on mobile App Stores and integration with standard apps such as email, calendar, contacts, etc. The UI is conversational and enables multi-modal interactions via voice and text. It includes SAP Hana integrations including OData. It contextualizes and analyzes informal unstructured speech to execute actions and present business objects, options and other relevant data in a simple conversational way. It is capable of improving the work life balance of its users by being also aware of the personal habits and data. If allows a user to start a task on your mobile device and continue on your desktop and vice versa. It includes the ability to create bots to augment and personalize standard functionality. It is aware of the user, business situation and relevant context and proactively advises the user. It includes machine learning that anticipates events and recommends actions based on individual and team behavior and proactively pushes content for better decision making.

Figure 3:
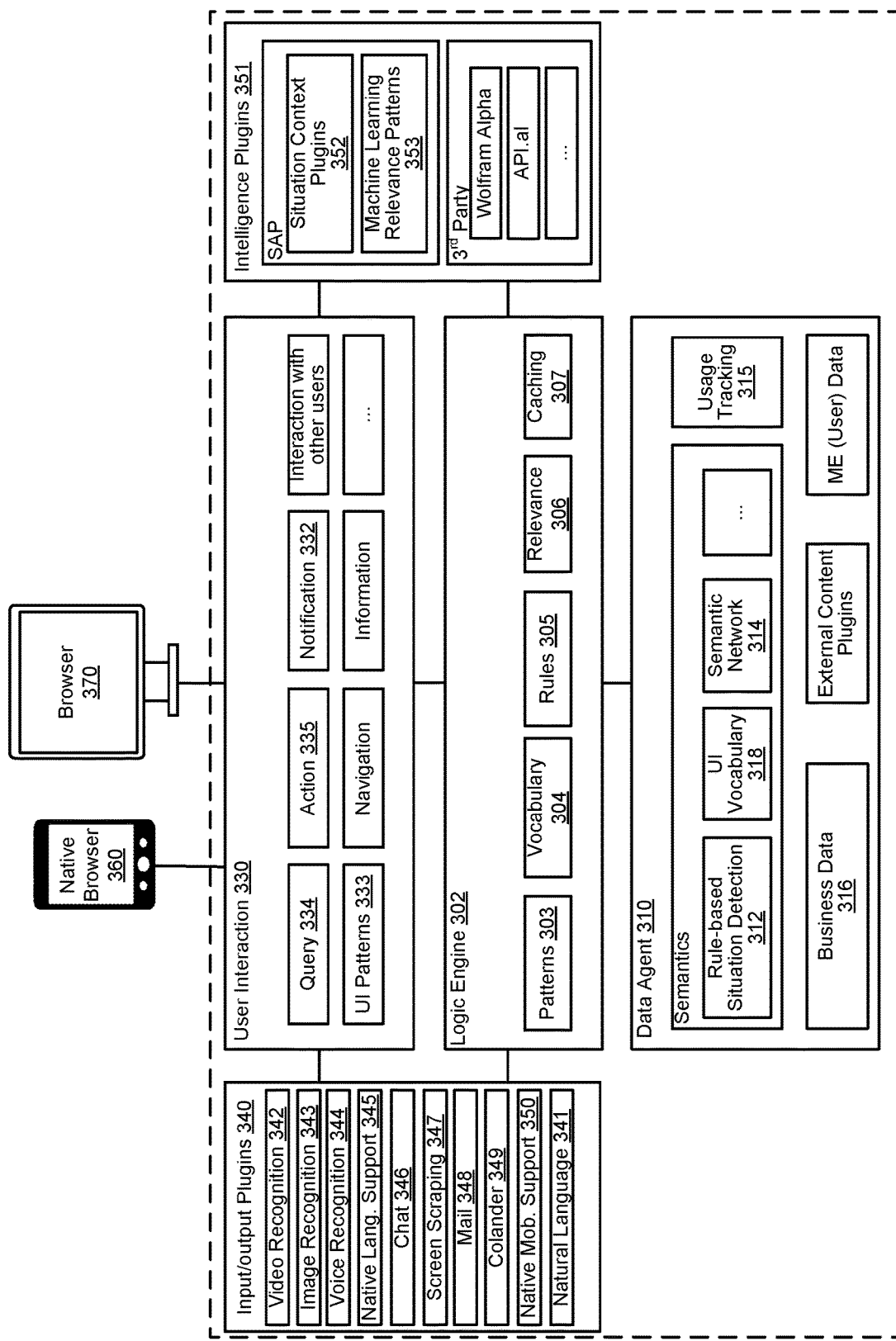
FIG. 3 is an example block diagram of an infrastructure to support and enable CoPilot.

FIG. 3 is an example block diagram of an infrastructure to support and enable CoPilot. CoPilot supports multiple different user interaction scenarios including, for example, notifications and conversations and queries. For notifications, the CoPilot would proactively inform the user about business situations that require user's attention. For conversations and queries, the user would be able to get relevant business insights by conversing with the CoPilot via natural language interactions (no knowledge of business apps would be required).

More specifically, with respect to notifications, CoPilot enables enterprise systems to proactively push notifications to the users. As a result the business users will be reminded of due actions or get recommendations of what should they work on next considering their current situational context. As part of these notifications, the users will get all the relevant information to require to understand and act on the system proposal. To detect situations that warrant notifications to users, the CoPilot will consider the following: Business domain-specific rules (shipped as part of the enterprise system), Rules defined by power users or IT administrators, Rules defined by end user, User context—it includes past situational recommendations ranked as useful by the users themselves, business data recently accessed by the user, interaction history logs, user's business role in the organization, data from "similar" users, location and device type from which the user accessing the system, etc. Note: the business data considered includes structured and unstructured content from heterogeneous sources, and is provided by Data Agents and Plugins, and Business domain-specific machine learning algorithms.

The CoPilot supports this domain-specific detection of situations with a set of predefined best practices, rule engine, a framework that allows to add value via plugins and services such as provisioning of the user context. Next we will use an exemplary scenario to describe in more details the function of the different architectural components when detecting a relevant business situation and delivering it to the relevant business users via notifications.

Figure 4:
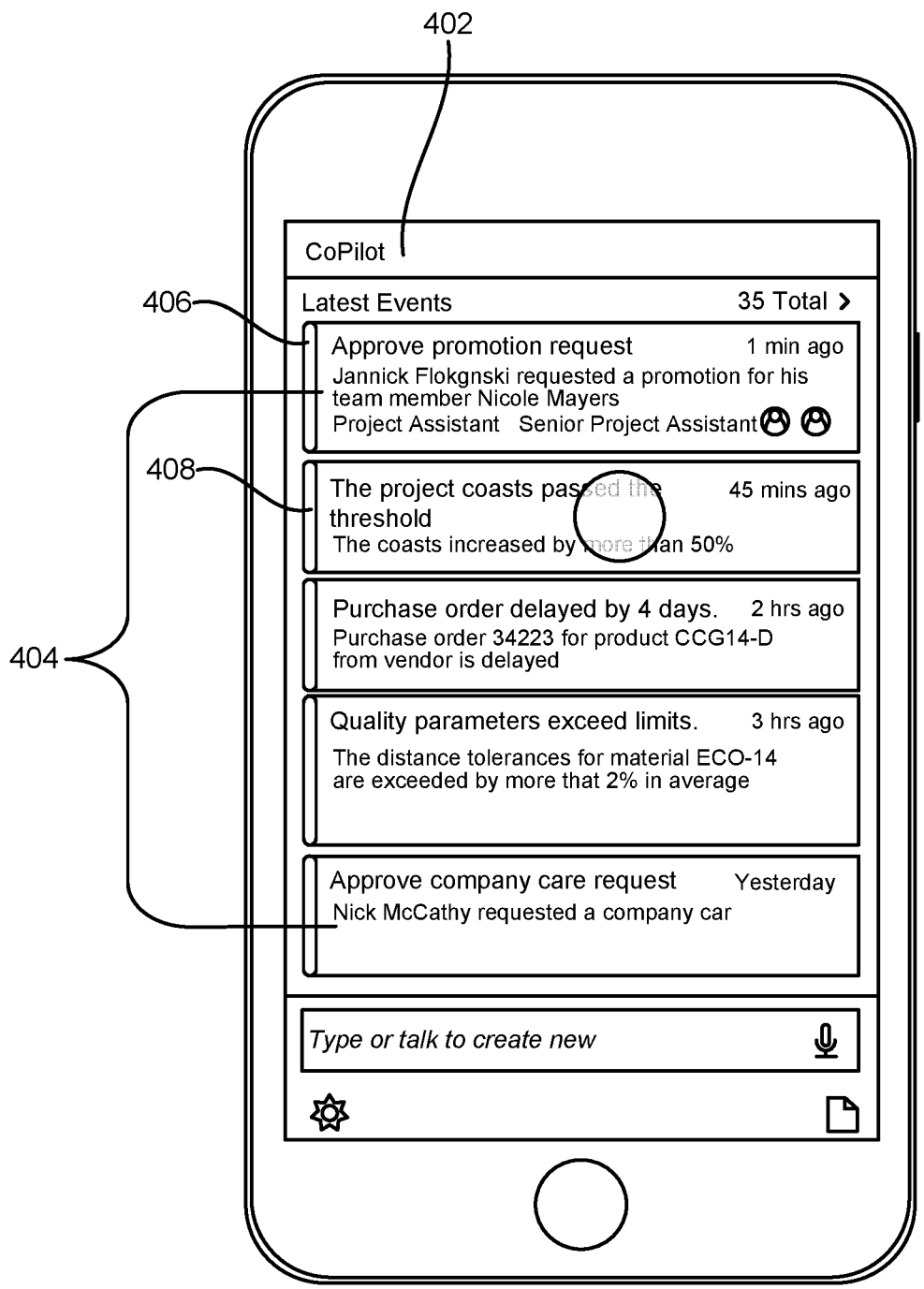
FIG. 4 is an example CoPilot user interface on a mobile device.

Referring to FIG. 4, an example CoPilot user interface 402 is depicted on a move device 400. In the notification scenario depicted on user interface 402, a project manager (PM) at company X opens the CoPilot and gets a list of notifications 404. Next to each notification there is a visual identifier 406 (as pointed to for the first notification item) suggesting their criticality (red, orange, grey). The visual identifier 406 (e.g., the visual identifier for the first notification item) is depicted as a colored, vertical bar on the left side of each notification. The PM's attention is immediately attracted to notification with the red identifier 408 (a potentially critical situation), namely the one that says ""The ABC project costs passed the threshold.—The costs increased by more than 50%".

Referring back to FIG. 3, aspects of CoPilot may be supported by an infrastructure as depicted in FIG. 3 comprising among other things a logic engine 302. A logic engine 302 may include among other things any number of modules or components including for example patterns 303, vocabulary 304, rules 305, relevance 306, etc. The logic engine 302 is configured to determine at least a context indicia and a user role, process at least one item in the selected collection data structure using the context indicia and the user role and generate information for display on the user interface responsive to results of the processing.

The data agent 304 (e.g. an enterprise business system) contains a set of business domain-specific rules (Rule Based Situation Detection 312). They are configured with parameters by key users (or IT administrators). These rules are evaluated at time intervals by a rule engine optimized for the system's application domains (e.g. discrete manufacturing, utilities, retail, etc). The rule engine is not only integrated with the various business processes running in the system, but also has access to the logical data model (Semantic Network 314), Business Data 316 and a UI vocabulary 318.

If a rule returns a positive evaluation (by analyzing the relevant business data 316 and provided parameters), a notification 332 in the user interaction module 330 gets triggered. In the project management example of FIG. 4, there would be a rule that will evaluate the costs of projects against a configured threshold value −50%. The data agent 310 does not know which users shall get the notification 332. Therefore, it simply provides the notification data to the logic engine 302. The data agent 310 does not hand over pure raw data but also passes along the related business semantics as defined in the UI Vocabulary 318 (for the 50% threshold value the semantics is data_type="percentage"). This will allow the CoPilot to properly visualize the notification data.

Inside the logic engine 302, the relevance module 306 determines the recipients of the provided information. There are multiple criteria that could be considered. One consideration is the business roles that the business data 316 is relevant to. For example, an overdue purchase order would be of interest to a Purchaser or as in our example, projects exceeding their costs would require the attention of a Project Manager. However, not all PM-s shall be notified about the changes to a particular project (ABC as per our example). The relevance module 306 would also look into the business context part of the notification. As per it, the system could determine the list of PM-s assigned to that project. This is already quite precise user resolution, but the scope could be expanded a bit by considering additional data such as the usage history logs 315. The latter is a data mining operation based of which the system might determine that there are other users who have an interest in the project as they have marked it as a favorite, viewed it frequently, shared project information with others, etc (e.g. the manager of the assigned PM or an important stakeholder). Needless to say, the authorizations of the users will be assessed in order to determine if they are allowed to see such information.

The vocabulary module 304 and pattern module 303 in the data agent 302 would be used to convert the data into a humanly readable response (by mapping to a pattern/template). The natural language plugin 341 would use the data provided by these modules to perform the actual conversion. The input/output plugins 340 would be passed all the required information and "asked" to create textual or voice responses. Some of the template data could actually come from the natural language plugin 341 (for generic scenarios). The input/output plugins 340 include video recognition 342, image recognition 343, voice recognition 344, native language support 345, chat 346, screen scraping 347, mail 348, calendar 349 and native mobile support 350.

To accomplish the notification exemplary scenario, the following language template may be used (part of the patterns and vocabulary):

"The project costs {warning_indicator} the threshold average. The costs {kpi_trend} {kpi_value}"

With the help of the defined rules 305 in the logic engine 302, the natural language plugin 341 will derive the {warning_indicator}, {kpi_trend} and {kpi_value} values and as a result will replace {warning_indicator} with "passed", {kpi_trend} with "increased by" and {kpi_value} with "more than 50%".

Next, the Situation Context Plugin 352, which is part of the intelligence plug-ins 351, could enhance the data context from the data agent 310 and the relevance criteria (e.g. add additional business objects, find actions that can help resolve the situation, include more relevant users). The result is then provided to the Notification service (part of the User Interaction Layer 330). The CoPilot would also pick a proper UI Pattern 333 and use the UI semantics provided by the Data Agent 310 to compose the notification view fragment, for example Quick View panels for business objects, Tables and Charts for analytical data, or as per our example, a simple text view with a visual indicator to show the criticality of the information.

The Notification service pushes the notification 332 and its visual representation to the user, both through the native mobile push channels 360 (immediate availability), as well as through the Copilot browser app 370.

The Copilot application itself also acts as general purpose notification provider. It employs machine learning 353 to e.g. detect situations based on data in Copilot or in other productivity tools (email, calendar), and offers actions and information to the user that typically is relevant in such situations. Thus it enhances the situation detection and context resolution capabilities provided by the backend (Data Agent 310). Example: If the end users references project ABS in email communications with other users, the CoPilot might add additional relevant users to the notification context (as per the email recipients and senders).

As discussed above, another scenario is the conversation and query scenario with CoPilot. The CoPilot supports multi-modal interactions with its users. The latter can request data or ask for help via natural language queries (text or voice commands). The CoPilot will be capable of extracting the business semantics and parameter out of this commands and provide user back with relevant information and suggest proper actions to solve the problem.

Figure 5A:
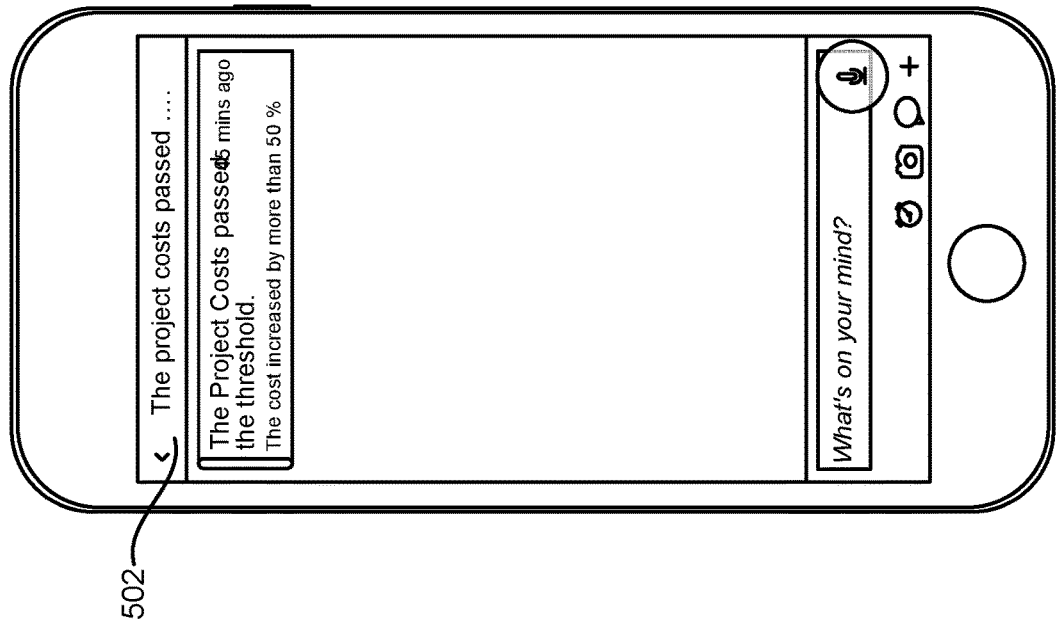
FIG. 5A is an example CoPilot user interface on a mobile device.
Figure 5B:
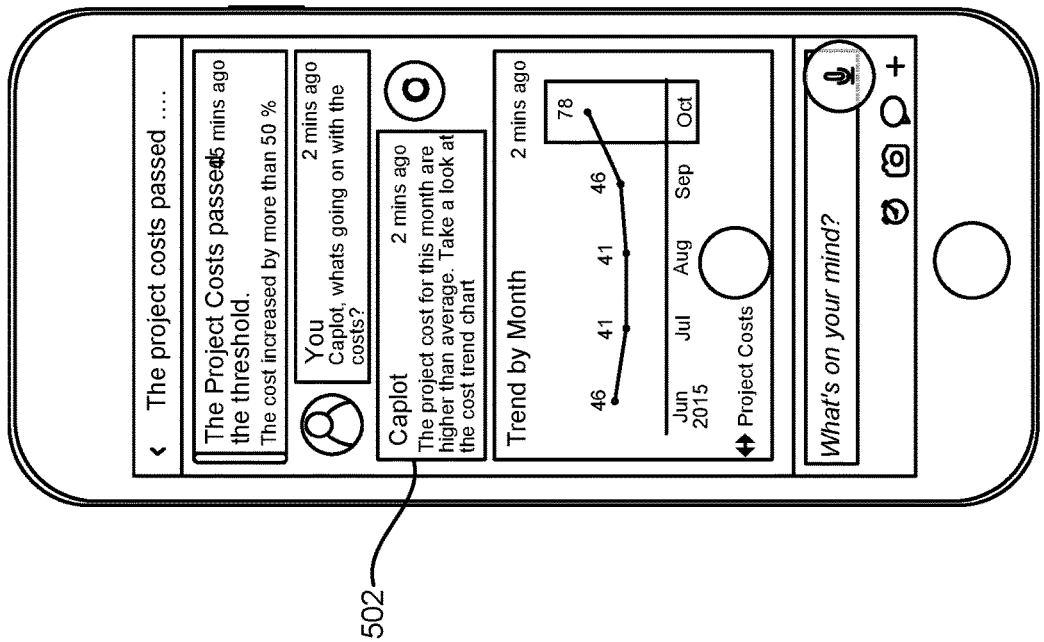
FIG. 5B is an example CoPilot user interface on a mobile device.

Referring to FIG. 5A, which illustrates a CoPilot user interface 502 on a mobile device 500, a project manager (PM) at company X opens the CoPilot and shoots a voice command such as "Copilot, what is going on with the costs of project ABC this month?" Referring to FIG. 5B, which illustrates the CoPilot user interface 502 on the mobile device 500, the Copilot will provide a meaningful response such as "The project cost for this month are higher than average. Take a look at the cost trend chart." and also provide a visualization of the related business data, namely the project costs.

As shown in FIG. 3, the CoPilot architecture supports different Input/Output channels 340 of interaction: voice recognition 342, typing text, scanning a bar code, etc. The Copilot service forwards the questions to the configured Intelligent Assistant plugins 351. Each plugin 351 is configured with domain-specific natural language processing rules (in addition to the general-purpose language processing rules), also called intents. These natural language processing rules allow the plugins to map natural language, as submitted by the user, to machine-executable actions and business objects and parameters. The pattern 303 and vocabulary 304 modules in the logic engine 302 provide the plugins with the required information. As per the discussed example, the user's voice command would be resolved meaningfully due to existence of the following configurations:

The pattern: "what is going on with the {target} of project {name} {time}?" translates to a business action of type Query 334 for the Project business entity.

As per the vocabulary 304 data the {target} could be the Project's cost, completion %, etc, {name} could be Project's name or ID, {time} can be "this month", "this week", "today", etc.

Using the rules module 305, the resolution of the detected actions 335 could be enhanced further. For example, based on the user's role in the organization the same patterns could be translated to different actions. Moreover, based on the user's business role different vocabulary sets could be applied (for example when sales agents refer to an "order" they mean the Sales Order business object, while the employees in procurement would deal with Purchase Orders). Here again the relevance module 306 could help determining what vocabulary and patterns are relevant to the user, as discussed above in the notification scenario.

In the PM example presented earlier the result of the natural language processing could be a JSON like data object similar to:

```
{
  Actions:
    {
      Action:
        {
          type: Query
          Action name: QUERY_TECHNICAL_NAME
          Confidence level: 1
        }
    }
  Business object: PROJECT
  Parameters:
    {
      Name: ABC
      Start date: 01/03/2016
      End date: 31/03/2016
    }
}
```

Some of the natural language processing rules could be automatically derived from the semantic network model 314 (a.k.a. ontology) of the data agent 302. Such automatic rules will be generic in nature and will probably not be utilized when processing data for a specific business domain (the domain rules will extend the generic ones). Being able to derive rules based on an ontology will still be useful as there might be scenarios where domain specific rules do not exist.

The natural language plugins 351 will also require access to the business data 316. The natural language processing is a complex operations and to better "understand" the command, the plugin would require to know what is considered a correct parameter value (e.g. recognize the project name 'ABC' value). This is in addition to being able to map the query to a pattern and vocabulary entries. It might be required to take a snapshot of the business data 316 and cache it in the logic engine layer 302 (to improve the performance and reduce network traffic). As a result a new caching module 307 might be added to the logic engine 302 or be implemented as part of the natural language plugin.

The natural language plugins could also consider the conversational context when parsing the text. Some objects and parameters may not be explicitly specified by the user with their questions, but inferred from preceding interactions.

The result would be rooted back to the natural language plugin where the returned data is processed similarly to the notifications scenario and visualized presented to the user in the native mobile clients 360 or the connected browser 370.

Aspects of a CoPilot facility may offer among other things any number of user interaction paradigms, mechanisms, etc. including for example a natural language capability. Such a capability may offer among other things a question-response model using any combination of one or more of the interaction mechanisms text, voice, image, video, etc. Aspects of a CoPilot facility may among other things be integrated into an area of a display screen, application, etc. such as for example a header bar, toolbar, etc. CoPilot may be invoked through an icon, link reference, etc.

CoPilot may function, operate, etc. as something of a dynamic, continuously-learning digital virtual assistant. CoPilot is among other things responsive, flexible, and extensible. Aspects of CoPilot may be supported by any number of different mechanisms including for example workflow engines, rules, events, the rating/ranking/etc. of an event, alerts, prioritizations, the definition/assignment/etc. of user roles, etc. CoPilot may receive, pull, retrieve, etc. information from any number of sources including for example Microsoft Exchange, Microsoft Lync, SMS/MMS/IM/etc. messaging facilities, social media platforms, internal and/or external enterprise systems, web sites, etc. CoPilot items, elements, entries, etc. may be shared, exchanged, etc. through for example any combination of one or more of the sources listed above.

CoPilot may offer a range of flexible, extensible, and dynamically configurable search mechanisms. CoPilot may offer a range of natural language processing services, capabilities, etc. CoPilot may receive, etc. information manually through user input using any combination of one or more of the interaction mechanisms text, voice, image, video, etc. CoPilot may employ any number of different 'auto learning' capabilities. CoPilot may continuously, dynamically evaluate a range of data, parameters, etc. to for example identify a universe of information, etc. that is important, relevant, etc. to a user (based on among other things a definition of a rule for a user).

During its processing activities CoPilot may develop any number of contextual understandings, references, etc. During its processing activities CoPilot may examine any number of items including inter alia: 'Things' that are on a user's mind and 'Work' that is pending within a user's role. During various of its processing activities CoPilot may incorporate, leverage, etc. any number of pieces of data including inter alia biometric information (e.g., from a wearable device such as a Fitbit), location information (e.g., from a GPS or LBS facility), etc. The sizing, placement, location, arrangement, etc. of artifacts on or within CoPilot are among other things responsive, flexible, alterable, and dynamically configurable. A user may optionally edit, customize, etc. aspects of a CoPilot item, element, entry, etc. A user may browse, traverse, navigate, etc. CoPilot items, elements, entries, etc. in any number of ways. While a CoPilot facility may improve, augment, etc. significantly aspects of a Fiori environment, such a facility is not limited to just a Fiori environment and may operate, function, etc. in any number of other environments such as for example standalone, in association with a system, etc.

A CoPilot facility may reside, operate, etc. within a user interface on any target device including for example any combination of one or more of inter alia a desktop, a notebook, a tablet, a smart phone, a smart watch, etc. and may among other things dynamically adjust or adapt aspects of itself to account for any particulars (e.g., display real estate, input mechanism(s), etc.) of a target device. A target device may be any combination of one or more of inter alia a desktop computer, a notebook computer, a laptop computer, a tablet, a smartphone, a smartwatch, etc. In a mobile context aspects of CoPilot may take any number of forms including for example any combination of one or more of web-based, native, hybrid, containerized, etc.

Voice/Conversational and Non-Native Device Interactions, UI and Relevant Content and Contexts User interactions can be interchangeably one or all input methods—voice, text entry and object selections (Taps), making the UI highly intuitive, flexible, consistent and naturally responsive across all devices. The scope of contextual user input and system return actions (via Logic Engine), navigations, information and contexts are provided based on business domain entities, system, end-user, and other comparable or "Like" users in the system including; communications, collaborations, transactions, data, notifications, forecasted or scheduled alerts, a User's Role Profile, relevance and access permissions, etc. as are defined by the user's personalized Fiori 2.0 apps and services as deployed in the FLP. As such, Copilot is a closely connected "Extension" of the user's specific, unique and familiar Fiori 2.0 experiences and configuration on all devices. User context and experience are completely aligned and synchronized. Numerous Action Types, (e.g. Adding an Object by Object Context, Type, Recent, Recognition, Screenshot (Item or Details), App specific Settings, etc. In addition to the above, a wide range of plugins are made available to the system including device services and accessibilities (email, calendar, phone telephony, camera, photo gallery, bar code scanning etc.), IoT, and SAP and 3rd party intelligence resources and services, etc. CoPilot supports both unstructured (Ad Hoc) and structured way for users for users to interact with the UI. It is completely intuitive to navigate and interact with Copilot functionalities as well as add new Copilot entities, content and actions. CoPilot inherently logically organizes Copilot content (Collections) according to content, context, and users Functionalities IT Administrator Configurable Business Domain-Specific Rules and Situation Detection that is integrated with app-specific business domains (Manufacturing, Utilities, etc.). User and System Defined Rules include Semantic Network Modeling (ontology) to create generic rules when Business rules (which take precedence) may not exist. Business Domain-Specific Machine Learning Algorithms provide users with the right data at the right moment (Push vs. Pull) to propose the next, best, and most appropriate action. Structured and Unstructured Business data from heterogeneous sources are accessed. Business-specific relevance Logic Engine mapping to user roles System provides Situation Contexts combined with Business Objects to present or make recommendations for possible solutions to identified situations.

A copilot entry is a living, gradually growing, artifact that accompanies the user on his way from issue to solution, supporting with context and actions as needed.

They first serve as a memory aid but easily can be turned into or simply create different object types. As such, the copilot functionality is bridging the gap between predefined application functionality and processes, and the user's personal way of working, that can be shared with other users in the Enterprise Business System as well as Copilot Machine learning and Intelligence modules.

Deployment Configurations Options—As a Fiori 2.0 "App" Copilot is platform agnostic without any dependencies to business backend systems. It sits on top of the Fiori architecture but has Cross-Fiori application integrations (Via App Descriptor Target Mapping, etc.) features for all Fiori 2.0 apps running on a user's Fiori Launch Pad (FLP), and so there is no need to implement ANY Copilot-Specific Content.

Deployment Options—HTML5 (Fiori application framework and programming model), across all devices and Screen Sizes. (Per Fiori On-Premise and Cloud Deployments) On Mobile—As a hybrid App and/or As a stand-alone Native App.

Figure 6:
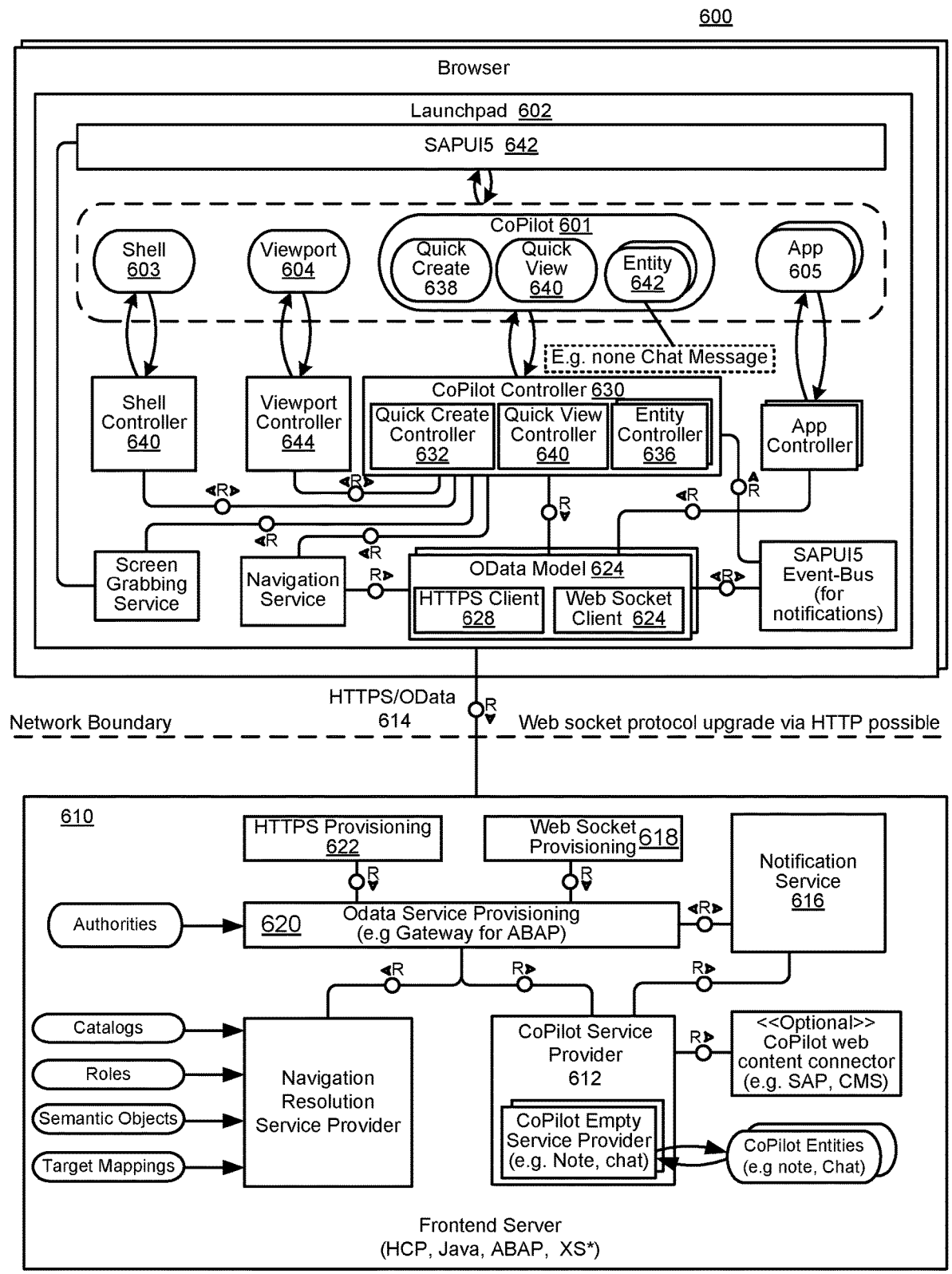
FIG. 6 is an example block diagram of an architecture to support CoPilot.

Referring to FIG. 6, an example block diagram illustrates a system 600 for an example system architecture for CoPilot 601. The Copilot 601 solution includes a frontend and backend part. The frontend part includes: Fiori Launchpad Shell 603 plugin (using the standard FLP plugin concept) with shell controller 640, Copilot Core Frontend JavaScript code based on SAPUI5 642 (views 604 and controllers 644 plus supporting logic), and Contextual Analyzer Microservice (not shown).

The Fiori Launchpad can be hosted from three different platforms: HCP 610, Enterprise Portal (Netweaver Java) and SAP ABAP System (NetWeaver ABAP). The Copilot frontend code is platform independent and can be integrated into any Fiori Launchpad implementation (HCP, Corporate Portal (Netweaver Java) and S/4 (Netweaver ABAP), assuming the FLP shell plugin concept is fully supported. In all three frontend deployment scenarios, the Copilot uses its cloud only backend service running on HCP. In other words, the Copilot frontend can run on-premise or in the cloud (Fiori-as-a-Service), but the Copilot backend is cloud only.

If the customer uses multiple Fiori Launchpads that are hosted on different platforms, the FLP configuration (for example to include the Copilot as a plugin and to make the plugin visible to certain user roles) is done on each platform separately. This fact will be mitigated by the Fiori Cloud Services, which will provide a new Fiori Cloud Cockpit and will automate this landscape setup and cloud onboarding.

The Copilot Backend Service includes Java Application implementing the OData 2 Service 620 and persistence layer (JPA), Database Schema(s) on designated HANA instance, Configuration UI implemented with UI5/Fiori. The Copilot OData Service will be deployed as a Java Application onto a Provider account on the productive factory HCP landscape. It will also be integrated into the HCP Service Cockpit as a HCP platform service. The necessary service metadata, which is required by the Service Cockpit, will be provided. This metadata is needed by the Service Cockpit in order to: render the service tile, facilitate the automatic subscription to the app when the service is enabled, display the link to the service documentation, display the link to the service configuration UI, display the link to administration UIs, and display the link to "Service Transparency Page" (Cloud reporting and monitoring).

The Copilot 601 is an integral part of the Launchpad 602. It consists of an application that is responsible for notes, chat messages, or quick creates and quick views. In addition, a plugin is initialized by the Launchpad 602 that loads the Copilot application 601 on demand as well as records the users' interactions with other Fiori applications and business entities. The Copilot lifetime is bound to the Launchpad lifetime. If the Copilot is active then it will be notified by the shell 603 about context changes like app navigation 605 or viewport 604 changes. The collections and items in the Copilot can be stored in relation to the context of origin or made related to a specific context in the Launchpad 602 by the user—in most cases to the current active business app. Copilot will store the business context meta-data associated to the created items. This serves as the base for deep linking, navigation, and business context driven item filtering.

The Copilot data may be stored on the Hana Cloud Platform 610 and uses a customer tenant account with subscription to the Copilot service provider application 612. The persistency fulfills all legal requirements and sizing. The protocol to the backend is OData over HTTPS 614 using OData service provisioning 620 and HTTPS provisioning 622 on the fronted server communicating the OData model 624 on the launchpad 602. The OData model 624 includes an HTTPS client 626 and a web socket client 628. To propagate Copilot specific updates to end users, Copilot invokes the Fiori Notification Service API 616. To notify users of Copilot updates to chat messages, collections or collection items while Copilot is still active a Web Sockets 618 implementation that is tightly integrated into the Copilot backend service is used.

Fiori notifications are not to be mixed up with the Copilot entities like chat messages or collection items. These are only represented within Copilot while Fiori notifications are represented within the Fiori notification center. Screenshots are supported via a client-side library and the image binary stored in the HCP document service.

Copilot uses KM documentation which is supported via xRay. Copilot and xRay shall be built within the Launchpad based on the same overlay concept so that they can be displayed side by side. It is possible to have xRay documentation in the Copilot and vice versa that when xRay is open for a business app it must be possible to chat via Copilot. So both z-order variants are supported.

The launchpad 602 includes a CoPilot controller 630, which includes a quick creates controller 632, a quick view controller 634 and entity controller 636. Copilot Quick Creates 638 and Quick Views 640 are regular Fiori applications but typically with a tiny scope. It only uses the minimal required attributes needed to create the business object. To improve app developer's efficiency the Quick Create apps can be based on Smart Templates.

Besides the Quick Create 638 and Quick View 640 applications, no Copilot specific content has to be provided by the app developer. Also, no additional annotations are needed—however, rich semantic annotations can enable the automatic contextual value transfer into e.g. quick creates by prefilling the form.

The following explains the principle set of entities 642 created and managed by the Copilot and a brief description of their meaning and use case. One entity is a collection. Each collection consists primarily of a set of items and some meta-information. The items contained in the collection can be homogeneous (all of the same type), but can as well be heterogeneous, that is, mixed (different item types). The existing collections can be accessed through the collection list which can be filtered and searched. A collection can contain several similar or different items: Note, Object, Chat, Quick Create, Data Snapshot, System Message, Copilot Message and more in the future.

Collections can be private, such as to support memory and the collection and its content are visible only to the owner. As soon as the first participant is invited to a collection, all items are visible to the invitee, as well as all other participants invited thereafter. A clear visual representation and affordance will be provided on collection level and possible content level where relevant to ensure that the user is aware that the collection and contained items is private, that is, especially that the collection and all of the contained items is now visible to participants post invitation.

The following discusses Collection Items. One collection item is a Note Item. The note item type displays text entered by the user that is augmented with system administrative data, such as created on or created by. The text in a note item is parsed; recognized objects are highlighted and can later be added as objects to the collection. Succeeding notes (not interrupted by other item types) are combined and are displayed as one (to a certain time delay limit).

Another collection item is a Business Object Item. The object item type represents a business object. It contains visual representation like an image for product or person, the name or /ID (name preferred), the object type, additional relevant attributes depending on object type like the price, address, or relation and the time stamp. A business object item can be added to a Copilot collection through a feature that discovers visible business entities of the currently running Fiori application, via QuickCreate or text analysis of chat/note messages.

Another collection item is a Chat Message Item. The chat message item type displays message text entered by the user for the purpose of communicating. It differentiates itself from the note text through the visual representation of the intent to communicate. In addition to the written text similar to the note, a chat item type includes the visual representation of chat participants, such as an image or initials, an online/offline marker, the name of the chat participant, the message text, and the timestamp. It is also possible to reference a business object from a chat.

Another collection item is a Quick Create Item. The quick create item type is used to create a business entities (e.g. a Lead or Sales Order) inside the Copilot window. It displays a subset of input fields of the original create screen of the business object. The system can prefill input fields from the context of the current page or items in the Copilot collection. After the object has been created it will be displayed as a regular related business object with a remark that it was created with the help of a quick create.

Another collection item is a Screenshot Item. The screenshot item type displays a thumbnail image of an area of data or Fiori 2.0 screen content that was selected by the user as a snapshot. A full screen view can be triggered from the detail screen of the item as well as the possibility to navigate to the context of origin where authorized.

Another collection item is a System Message. From time to time it makes sense to alert the user about something in the Copilot. Therefore a system message is needed. Some system messages may be clicked to trigger a menu or similar. These messages are triggered by the Copilot itself not by the end user. Copilot system messages are not to be mixed up with Fiori notifications introduced later on in this document.

Other entities may include Augmentative Functions on Item Types. In order for the Copilot to provide flexibility for the user to mix and use items as needed, a set of functions are provided for all item types as relevant for the item type. For example, an item type can be copied and used either to create a new collection based on the item type or Add to an existing collection.

Figure 7:
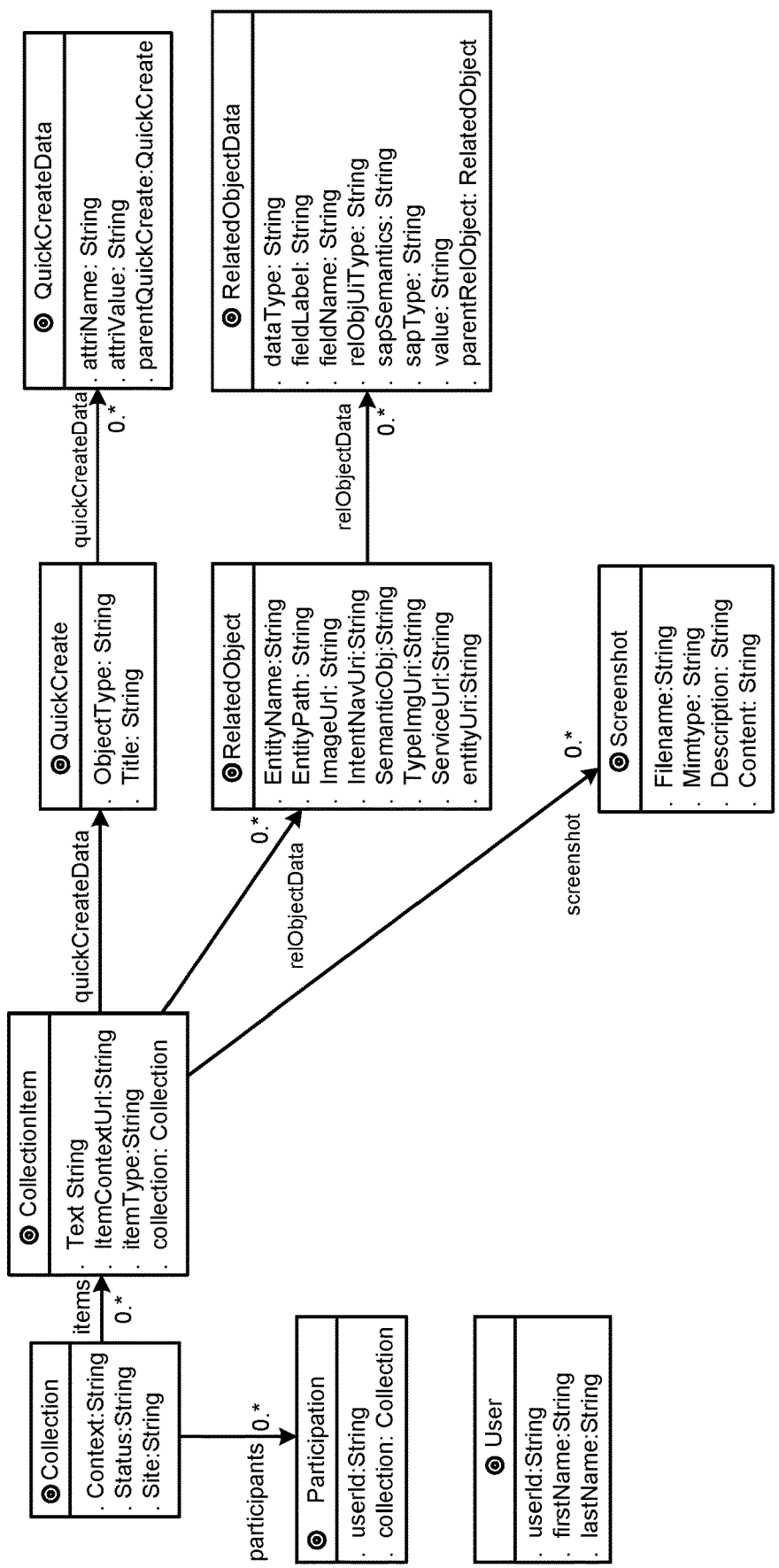
FIG. 7 is an example schematic of a technical entity model for CoPilot.

Referring to FIG. 7, an example schematic illustrates an entity model 700 for CoPilot, which include entities described above. This entity model 700 may be implemented in Java as JPA entity classes. Each JPA entity corresponds to a database table into which JPA will persist the entities and create them from.

The following OData entities are only transient, meaning that the Copilot service does not implement a persistency for them but only provides them for the client to consume:

User—Via this entity the client can query users (for adding participants for example) and get additional information such as first and last names. The user information will be provided by calling the "com.sap.security.um.user.UserProvider" API. This API is accessible at runtime using a JNDI lookup. Please note that for system messages no actual OData entity is required but they will be implemented using Web Sockets, and the Copilot UI will display these socket events according to the UX design.

Figure 8:
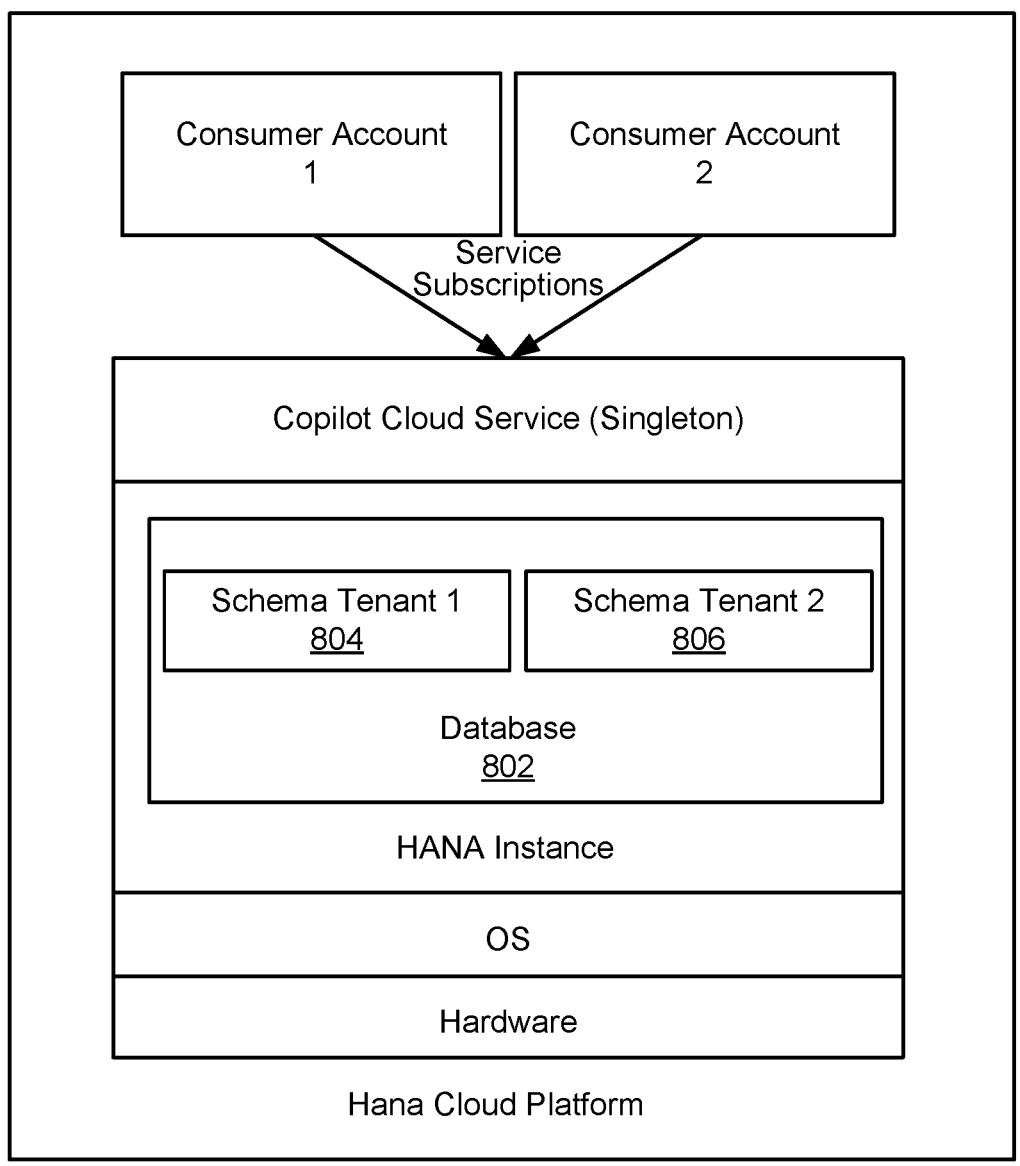
FIG. 8 is an example block diagram of platform illustrating multi-tenancy enablement of CoPilot.

Referring to FIG. 8, an example block diagram illustrates a cloud platform 800 showing multi-tenancy enablement of CoPilot. The Copilot Service will be multi-tenant enabled. Currently, a tenant discriminator column approach is used to support multi-tenancy. A target architecture a database 802 with separate database schemas 804, and 806 for each tenant will be considered, for optimized database performance and clear separation of tenant data (for example for backup purposes or when a tenant is deleted).

As soon as a new tenant enables the service or accesses it the first time, the database schema will be created automatically for that tenant (e.g., schema Tenant 1 804). This should be part of the "enabling" of the Copilot in the HCP service cockpit within a specific consumer account. At runtime dynamic JPA data source lookup will be used to ensure that JPA will persist into the correct DB schema belonging to the current consumer account. In order to connect and map a new tenant DB schema to the Java application, a Neo-SDK console client command is executed. This is automated as part of the service enablement or Fiori Cloud Service onboarding automation.

In order to be able to access and consume the Copilot OData backend service, the customer first of needs an HCP account. Within this consumer account, the Copilot service has to be enabled in the HCP service cockpit. The enablement of the service will create a subscription to the Copilot OData Java application (which technically resides in the Copilot provider account) behind the scenes.

It is planned that this entire setup can be automated by integrating the Copilot into the Fiori Cloud Services and their on-boarding automation from the new Fiori Service Cockpit.

The Copilot frontend JavaScript code will only contain a hardcoded relative URL to pass to the SAPUI5 OData-Model. This relative URL has to be mapped to the absolute service URL (including the consumer account, which will be resolved to the correct tenant ID). Depending on the deployment scenario, this URL mapping is achieved in different ways: FLP runs on-premise and on HCP.

In the case of FLP running on-premise, the relative URL has to be configured in the web-dispatcher to point to the correct HCP service URL. In the case of FLP running on HCP, the URL has to be mapped via an HCP destination. The destination name has to match the assumed destination name in the "neoapp.json" file and hence has to be documented in the service documentation for the customer to be able to look it up.

Referring back to FIG. 6, Copilot is developed as a Fiori application that is tightly integrated with the Launchpad 602. Copilot is part of the shell in order to be accessible from any screen across different applications. This is achieved by running in a window container which floats above the standard content. This allows Copilot to provide functionality for any Fiori application without having to integrate into the layout or actual content of the app. Copilot consists of a Fiori application and a plugin, which is a UI5 component that follows the plugin concept of the Launchpad 602. This means Copilot is automatically loaded during the shell bootstrap. Only the plugin is created during the initialization of the Launchpad 602. The application part is lazily loaded the first time a user starts Copilot. Copilot is implemented in a platform-agnostic way. Copilot is a SAP UI5 component and provides all the standard deployment and lifecycle features. On ABAP and HCP platforms, Copilot is enabled via user role assignment.

Since Copilot is initialized alongside FLP its lifetime is bound to the lifetime of the Launchpad. The Copilot Fiori application provides the main functionality within the floating window container. The floating window container is part of the FLP delivery and is provided to Copilot. It supports three different states: floating, floating collapsed, and docked. When Copilot is active, it uses shell services to get notified about context changes like app navigation or viewport changes. Copilot uses shell APIs to access the currently running application context in order to analyze its business entities and metadata.

Even when Copilot is not running in the foreground, the plugin analyzes the current application context to keep track of the most visited and most recent items the user is interested in.

As mentioned above, Copilot supports different deployment scenarios includes Cloud based HANA Cloud Platform (HCP) and on-premises with cloud based Copilot backend on HCP. The frontend (plugin and application) of Copilot only has one code line for on premises and HANA Cloud Platform installations since Fiori applications must be deployable on the ABAP-based frontend server as well as on HCP without modifications.

For Cloud based HCP Deployment, Copilot uses a specific minimum UI5 version as well as specific versions of the Launchpad and shell services like CrossAppNavigation and other shell APIs. By using the FaaS UI technology stacks it can be assured that these requirements and dependencies are fulfilled. Copilot provides a specific version for each UI technology stack (two maintenance, one innovation stack). These versions are "delivered" via subscriptions to the customers HCP tenants. Cloud based HCP deployment for the frontend of Copilot will follow Fiori as a Service (FaaS) guidelines, which already takes multi-tenancy, configuration, integration, customization into account. FaaS and by extension Copilot supports the following runtime scenario: A central access point where Copilot and all other Fiori applications run on the HANA Cloud Platform. A local access point runs Copilot and Fiori applications through a proxy embedded into the local application landscape. They key difference between a standard Fiori application and Copilot is that the backend service in this runtime scenario is still hosted on HCP.

For on-premise deployment, Fiori Cloud Service enablement is used to deploy Copilot for on premises scenarios. This runtime scenario uses a certain level of user synchronization and session synchronization between the on premises application landscape and the HCP tenant account. These capabilities are provided by the Fiori Cloud Service Enablement infrastructure. The HCP-Java backend service will be implemented in a backward compatible way. For any incompatible changes, a version of the backend service will be maintained to support different versions of the Copilot frontend in parallel. Copilot will provide the necessary steps and artifacts for deployment and configuration on the ABAP-based frontend server until Fiori as a Service Enablement becomes available and supports the on premises onboarding and runtime scenario.

Versioning of Copilot will follow the semantic versioning concept. From an HCP account cockpit perspective, each minor version becomes its own HTML5-application that a customer can subscribe to. The Launchpad points to an App Descriptor which references an HCP HTML5-application's path, which in turn points to the specific minor version of an application. This is synced with specific Launchpad versions, which will eventually be handled by FaaS UI technology stacks.

For authentication, the Copilot Java OData Service is accessible after successful authentication. The main authentication process from a user perspective will be: User opens the Fiori Launchpad (FLP) and authenticates against the hosting system (either Fiori on-premise or Fiori-as-a-Service/HCP). When opening the Copilot, the JavaScript code in the browser will try to call the HCP OData Service. If the FLP runs on-premise, the Web Dispatcher has to be configured in order to forward the request from a relative URL pattern to the right HCP URL. It is then assumed that the Copilot will use XHR authentication. The authentication will validate the user against a trusted Identity Provider, which is setup under "Trust" in the HCP cockpit. Here the customer can add the on-premise backend system, for example.

HCP offers a variety of authentication methods and configurations, which bundle a set of allowed methods. The default authentication configuration used in the Copilot Java OData Service will be "SAML2", which offers SAML or Application-to-Application SSO.

The configuration of the Copilot service will be possible via an own configuration UI (Fiori/SAPUI5 application) that will be accessible via the service tile in the HCP service cockpit. The configurations will be stored in Copilot specific configuration DB tables. The configuration UI is accessible if the user has a specific user role allowing access to the configuration. Configuration settings for the Copilot will include: Permission to store some business data in Copilot service to enable Copilot search to find collections that contain that data and enabling of functions like converting business object to note text.

Business objects are a specific Copilot collection item type that users can add to their collections. These entities can either be discovered through the currently running Fiori application context, through search, via recent objects or text analysis. Copilot uses shell APIs to access the currently running application context in order to analyze its business entities and metadata. This may be implemented in a generic way called the Contextual Analyzer. The purpose of the Contextual Analyzer is to discover, classify and prioritize business entities that are currently being displayed in the UI. Results are classified and prioritized by how relevant business objects are. As an example, a Sales Order displayed in the Object Page of the Manage Sales Orders application is considered more relevant than a Sales Order bound to a row in a table.

Since business object data can contain sensitive information and may require authorization, Copilot does by default not persist this business data. Optionally, persisted data can improve certain Copilot features and functions such as full text search support for business data (in addition to unstructured notes and chat text) and faster loading of collections. The entity URI of a business object is persisted as part of the item data and is used to perform live loading of the current business object data for display in the collection. This also allows Copilot to perform an authorization check.

The prerequisite to discover business entities from an application screen (for example a Fiori application running in the Launchpad) is a UI5 component which uses data binding, preferably to an OData service. This means that applications do not have to implement any API or provide any configuration. The OData entities including metadata and annotations can be derived from the managed objects of this UI5 component. The Contextual Analyzer uses annotations (Badge, HeaderInfo, Identification, LineItem, SemanticObject) to determine certain business object properties (e.g. title, subtitle, etc.). The way these annotations are used is consistent with how annotations are generally defined and consumed by Fiori 2.0.

If no annotations are present, the Contextual Analyzer tries a set of heuristics to determine these business object properties. For example, the OData attributes are checked for attributes called "title" or "description". The Title and Subtitle properties are the primary values used to display and persist the Copilot contextual objects and therefore have the most extensive heuristics. A minimal amount of property metadata is captured including property name, label and type, and compound properties are captured by looking at sap:text, sap:unit and sap:semantics; allowing Copilot to use the appropriate formatters to display labels, values and compound properties.

Copilot utilizes the Launchpad Fiori Search Model to provide search capabilities across all supported data sources. Data sources can be searched directly from within Copilot and results can be added as items to a collection. Fiori search data sources may be implemented as REST services and do not define metadata like OData services, and therefore no metadata is provided. Instead, the business object's title and subtitle are provided by the search results. Furthermore, search results do not contain the equivalent of an OData entity URI, so live loading of business object data and authorization checks are not possible.

Copilot allows a user to add business objects they have recently viewed or worked with to their collection. The Contextual Analyzer can discover, classify and prioritize business objects that are currently being viewed within Fiori apps. Copilot subscribes to events from the Launchpad that are invoked when a user navigates between and within apps, allowing Copilot to know what business objects the user is visiting. This allows Copilot to implement Object Usage Tracking across all Fiori apps that are running within the Launchpad, and to persist tracking details such as which business objects have been visited, how often and when. Only objects that are prioritized with a high priority are tracked, such as leading objects (e.g. the selected item in a master-detail floorplan), in order to reduce the amount of noise from related or secondary objects displayed in the app.

Navigation to collection items is supported for entities that were added to a Copilot collection. These items were either discovered by Copilot through the context of an application, via search, added through a QuickCreate or by taking a screenshot.

On the item detail, two different kinds of navigation are available: navigate to origin and navigate to factsheet (open). Navigate to origin allows to return to the application where the collection item was discovered. This is achieved by persisting the browsers location at the time of discovery alongside the collection item. A collection item added from the search results or through text analysis does not support this type of navigation. Navigate to origin is also supported for the collection itself. In this case Copilot navigates to the app where the collection was created.

Navigate to factsheet (open) will open the factsheet application (if deployed and available) associated with this semantic object for this business entity. The navigation follows the UI5 navigation concept for intent-based navigation and uses the CrossAppNavigation shell service. The information for navigation is the semantic object name, action and parameters. This information is available through the OData service metadata and its annotations as well as the data of the OData entity of the collection item itself. The navigate to factsheet option may not be available for screenshots or note/chat collection items. The semantic object name can be found based on the SemanticObject annotation of the Common vocabulary.

If an OData service contains this definition in its metadata, the UI5 control SmartLink and its related classes can identify possible navigation targets via the "CrossApplicationNavigation" service of the unified shell. SmartLink uses the current binding context of the application to construct the necessary parameters for navigation. Copilot will use SmartLink to generate intent-based navigation links. Either already available SmartLink APIs can be used, or a new requirement for UI5 has to be created. The item detail within the Copilot is rendered as Quick View component.

Quick Views show the item detail of business objects within the Copilot itself (when clicking on the object—see the UX specification of Copilot. Technically, Quick Create and Quick Views are very similar; so in the following, "Quick Create" can also be read as "Quick View".

Conceptually, each semantic business object (Sales Order, Lead, Opportunity, etc.) that wants to support Quick Create (or Quick View) in the Copilot has to provide a designated Quick Create Fiori application, which will then be embedded into the view of the Copilot Quick Create item. There are in principle two ways a Quick Create or Quick View application can be provided:

Copilot will provide a new smart template, which can be used by the application developer for creating these Quick Create applications. The application developer only has to create the application shell (e.g. by using "sap.ui.generic.app") and use the provided smart template as the root view. The Quick Create smart template will require the underlying Gateway service metadata to contain a new Quick Create OData v4 annotation, which contains the metadata about the input fields, which are supposed to be rendered and to which OData entity fields they are bound to. The controller of the new smart template will support the creation and persistence of both Draft-enabled and non-draft-enabled business objects.

The application developer does not use the new smart template but creates a new Fiori application from scratch, containing the Quick Create UI and controller logic. This would only be required if the provided smart template does not meet the create requirements of the corresponding business object.

In this case, the Quick Create application has to notify the Copilot as soon as the business object was successfully created so that the Copilot knows when to update the item. The provided smart template controller handles this automatically, but in case the Quick Create app is "freestyle", the application is responsible for this. The suggested way is to fire an event on the used OData model instance of the form:
    oModel.fireEvent("requestCompleted", {success: true, method: "POST", createdObjectContext: oResponse.context, source: this.getView( )});

The Copilot will listen to a successful "POST" event with "createdObjectContext" as a parameter.

Technically, Quick Create items are created by embedding a SAPUI5 UIComponent into the Copilot item view. The list of valid Quick Create UI components is retrieved at runtime by reading the FLP target mapping configuration and looking for all mappings for semantic action "quickcreate", or "quickview" or quick views.

The UIComponent instance is created using the cross-app navigation service provided by the FLP shell. In order to prevent the embedded Quick Create UI component to react to browser URL hash changes (which should control the main Fiori application but not the embedded apps in the Copilot), its UI5 router instance is stopped once the component has been embedded. This also means that QuickCreate apps have to be one-page apps without any internal navigation.

The Quick Create smart template component uses the new Quick Create annotations to generically render a Quick Create UI. The generic UI supports header level fields as well as the creation of item level data. The Quick Create smart template controller extends the generic "sap.suite.ui.generic.template.lib.TemplateViewController" class provided by the smart template framework team. This way it is possible to generically create and persist draft-enabled business objects.

Screenshots in copilot can be used to take snapshot of selected area of an application and display it in the collection. The open source html2canvas library is used for this purpose. The library script traverses through the DOM of the page it is loaded on. It gathers information on all the elements there, which it then uses to build a representation of the page. In other words, it does not actually take a screenshot of the page, but builds a screen representation on HTML Canvas based on the properties it reads from the DOM. The library returns a canvas, which is converted to a base64 string. Also in order for html2canvas to support svg elements like different types of charts, the open source canvg library is used for this purpose. The html2canvas library returns the screenshot image to be displayed on the Copilot collections.

The screenshots in Copilot HCP is persisted using the Document Service provided by SAP HCP. The SAP HCP document service (document service) provides an on-demand content repository for unstructured or semi-structured content. The Copilot backend service running on SAP HANA Cloud Platform can easily consume the document service using the JAVA client library based on Apache Chemistry. The backend service can create a document repository internally in the context of the tenant by providing unique name and repository key. Once a connection is established to the document service, the backend application connects to the repository to get a session. The backend service triggers the document service to add, retrieve and delete the screenshot images from the repository.

The frontend application can retrieve the document content by accessing the URL to the document service. The backend service application can accept incoming requests from the front end and forwards them to the document service. This is achieved using a new servlet that extends from AbstractCmisProxyServlet that acts as a proxy bridge. The proxy bridge is responsible for user authentication. The resources consumed in the document service are billed to the HCP account that deployed this proxy bridge (the Copilot account). The document service supports multitenancy and isolates data between tenants. There is no additional logic required at the application level.

Copilot will provide the end-user an increased value and context awareness of its collaborative features by recognizing and identifying entities out of unstructured data (free text) and offering an easy way to interact with them. Copilot will make use of SAP HANA Text Analysis, especially the feature called entity extraction.

Entity extraction analyzes unstructured text, in multiple languages and from any text data source, and automatically identifies and extracts key entity types, including people, dates, places, organizations, or other information, from the text. An entity is an instance of a thing, can have a meaning and is usually identifiable. Copilot distinguishes between basic entity types (like date/time (absolute/relative), location (city/country names), contact info (phone number, email), etc.), and business object entity types (like product, salesorder, employee, customer, etc.).

By automatically extracting entities from free text, the Copilot UI client could support scenarios like, displaying (business) objects, e.g. as factsheet, providing (semantic) actions on business objects, providing embedded actions on identified basic entities (contacting via email, phone), linking to a map application, etc., providing the option to add identified (business) objects to a collection, and matching identified (business) objects for an auto-fill feature of input fields like "Quick-Create".

The Copilot Text Analysis component is integrated into the Copilot Service. The Copilot Text Analysis component will analyze and extract free text (like a note or a chat) that is entered by an end-user through the Copilot UI. The text analysis result will be a list of identified (business) object entities with its related (business) data and (semantic) metadata (e.g. business object type, navigation information, actions, rendering (e.g. as a factsheet).

The Copilot Text Analysis component is configurable. It will define, configure and support a default set of basic and business entity types. Entity types should be configurable to extend the components extraction capabilities. SAP HANA Text Analysis already ships predefined basic entity types whereas Copilot needs to define business object entity types. Copilot defines a default content set of dictionaries and rules for business object entities.

The following functional areas define the Copilot Text Analysis component, Text Analysis (Entity Extraction) including (custom) post-processing, Look-up of extracted entities with SAP Fiori Search/Enterprise Search, and Persistence of result set.

The architecture for building and integrating text analysis for Copilot is based on SOA principles. The Copilot backend service will be the main integration hub for these described functional areas. For now, this component will rely on SAP HANA XS engine and the HANA Text Analysis XS API to expose a web service to use the text analysis features. This web service is consumed by the Copilot backend service.

Once a textual collection item is persisted, the text analysis web service is called by the Copilot Backend to discover, recognize and classify related tokens of text of the collection item (e.g. a note or a chat message) as an entity. The result of this web service call will yield a list of extracted entities. Every entity provides information about its entity type, metadata about its location within the text (offset position, sentence number, paragraph number) and if possible, it provides an identification information (like an ID or ID descriptor/variant).

There are 2 approaches available to extract business object entities.

The first approach is to recognize type-qualified business entities with a subsequent ID variant through a rule, like [KEYWORD] [ID]. An example would be 'salesorder 12345' or 'SO#12345'. This is achieved with custom rules rules/rule set (Custom Grouper User Language (CGUL)). The keyword here is a word or variant that describes the business object entity name. Those rules need to be defined.

The second approach is to recognize entities only through an ID or an identification variant without any type-qualified keyword. An identification variant is basically a name or description that can identify an entity. An example here would be a product name or product ID, 'iPhone 6s' or 'HT-1000', employee name or employee ID or 'John Doe' or 'i123456'.

The difference here is that an end-user in a real-life scenario would not type-qualify those entities in a free text like 'person i123456' or 'product iPhone 6s'. Master data (like product, customer, supplier, employee, org unit, etc.) usually provides the characteristic to identify the entity with an alias like a name or a short description. Text analysis supports this approach by defining custom dictionaries. An idea here is to create those dictionaries semi-automated through scripts by processing master data (through tables or OData endpoints). It requires domain knowledge to create specific variants like abbreviations or misspellings of entity names or IDs supporting multiple languages.

Basic entity types (like dates, phone numbers, emails, location) are already predefined and configured. But those can be extended through dictionaries and rules as well.

The text analysis web service can be extended with (custom) post-processing functionality of its result. Post-processing is usually needed to join, deduplicate, cleanse, enrich and normalize text analysis result sets. Smart Data Quality (SDQ—part of SAP HANA Enterprise Information Management) already provides out-of-the-box cleansing functionality to accomplish those tasks for entity types (like address, person name, organization name, phone number, email address). The SDQ cleanse feature can be used within SQL Script which can be consumed by a HANA XS application.

Cleansing and enriching is usually the process of cleaning up wrong, misspelled text, adding (meta) data, like gender on names, adding address information.

Normalization on the other side does transform a recognized entity into a structured data object, e.g. from recognized text 'salesorder 12345' into {entity-type: SALESORDER, identification:12345}.

After the extraction and the post-processing, a lookup web service is called by the Copilot Backend to find the business object and its related data and (semantic) meta data. Copilot will rely on SAP Fiori Search/Enterprise Search as a look-up service for extracted entities. SAP Fiori Search enables the search for business objects across core SAP Business Suite applications. The result of the lookup service will enrich extracted business entities with its data like icon, title, subtitle and additional (semantic) metadata to make use of the identified business object by the Copilot UI (render, navigate, provide actions, etc.). The entity type information is used to narrow down the list of possible (matching) results when searching for an ID or an identification variant. The result set sorted by ranking/relevance is used to check if the look-up found the matching business object.

The results of the text analysis and the look-up will be persisted by the Copilot Backend Service as an optimization for faster responses of READ scenarios (of collection items in a collection). Each collection item can have multiple extracted and identified entities.

On the client side, the Copilot client interprets the entity extraction and look-up data to render the markup of identified entities within the free text (of a collection item) and to enable more UX options (e.g. popover with factsheet, provide navigation to specific application, actions on business object).

Contextual data from the currently open collection can be used to assist the user in entering form values for quick creates and app forms. Auto-filling of forms leverages data that is discovered through text analysis and collection items and intelligently fills form values. Auto-filling looks at all editable input components in a form and analyzes their associated entity metadata in order to intelligently choose corresponding contextual data to fill the input. This includes invoking input value helps if needed.

As an example a collection could contain unstructured text such as, "the supplier will be iTelo and the product price is 295.00 EUR" that can be used to auto-fill some inputs for a Sales Order quick create. The text will be analyzed and "iTelo" will be identified as a potential value for a supplier, and "295.00 EUR" is a potential compound value for price. The Sales Order inputs and their associated metadata will be inspected to see if the form is expecting a supplier, and if so will fill it with the value "iTelo", including executing and resolving a value list if the target property requires it. Similarly if a price input is found it will be filled with "295.00" including its compound currency property of "USD".

Simple value persistency is also supported, when quick creates are not draft enabled, allowing users to begin entering values into a quick create and return to complete the form later, or to collaborate on form filling with other users.

Figure 9:
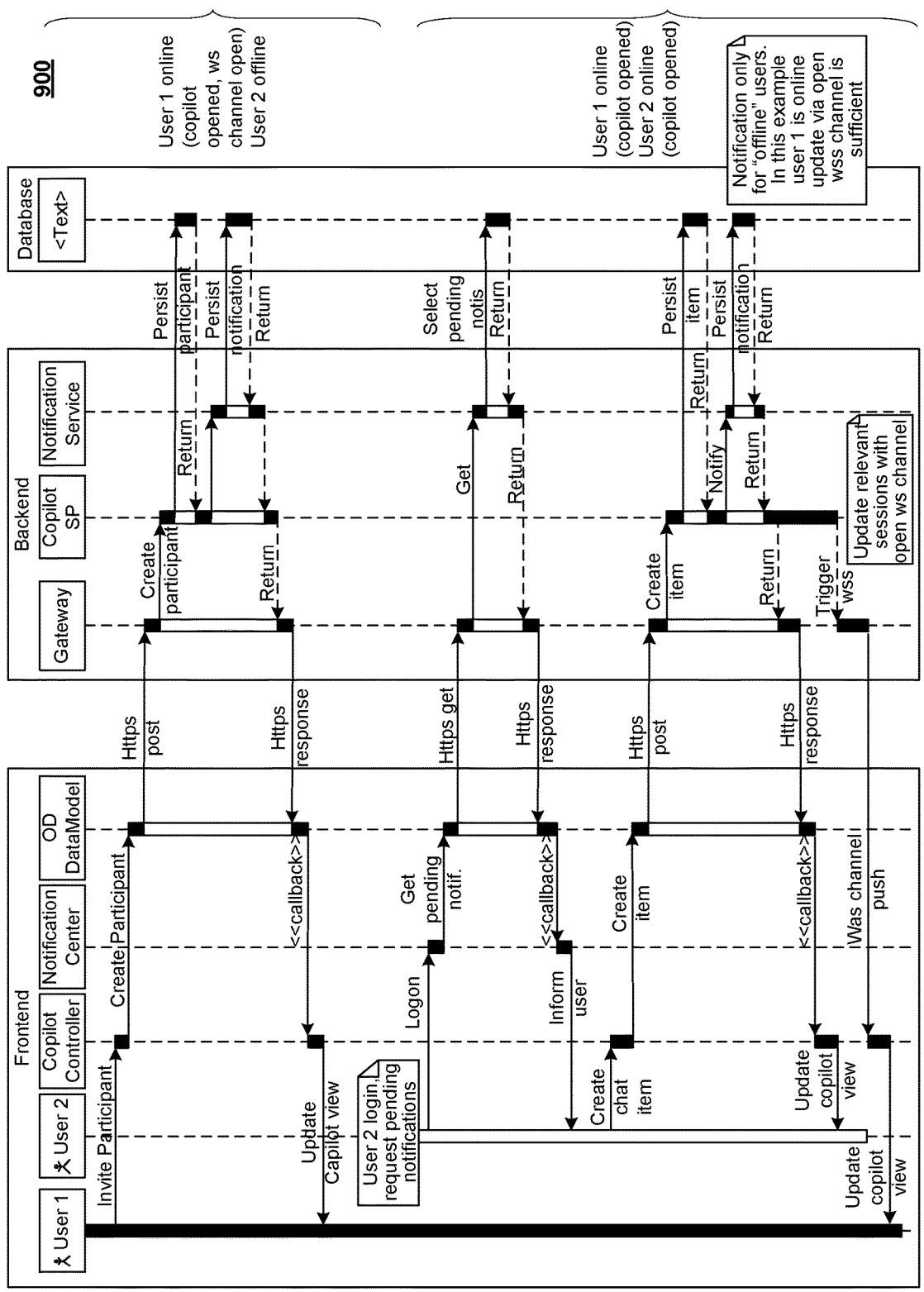
FIG. 9 is an example sequence diagram illustrating an example notification flow.

Referring to FIG. 9, an example sequence diagram 9000 for an example notification flow. Copilot uses the Fiori Notification service for sending notifications to online and offline users. Users should be notified during certain events such as when they are added as a participant to a collection, or if a collection they are participating in is updated. If a user receives a notification while online they should immediately see it, and if they are offline it should be persisted and displayed when they are back online.

Since the Copilot service is proposed to become a Cloud service, the Fiori notification service should have an OData interface that Copilot can call through the Cloud Connector. The sequence diagram 900 shows the flow of information, such as Fiori notifications triggered by the addition of participants, as well as by their activity (adding items). In particular the diagram shows differences in the flow based on the status (online or offline) of the participants. The sequence diagram 900 uses the example of chat, because as a communication item type it can be assumed that it will have the highest flow activity. However, the sequence is true for all item types.

In the upper part only user 1, the collection owner, is online in the Copilot and invites user 2 who is currently offline. After that user 2 logs in and gets informed that he was invited to the collection. He then posts an item to the collection while user 1 is still "online". Copilot supports collaborative features, in which multiple participants can add content to the same collection, and therefore the data model requires real-time push updates. When users add, edit or remove content from a collection, all other users that are viewing the same collection should get an instantaneous real-time update of the change. Push updates not only provide real-time updates of content, but also remove the need to perform backend requests to check if content has changed, such as during navigation. This results in a highly responsive and pleasing User Experience in which the user is not needlessly waiting for the UI to refresh during navigation, and also reduces the amount of network and server load created by the app.

Copilot leverages the standard and widely supported JavaScript Web Socket API to create a persistent socket connection between each client and the backend. A single socket is used to support as many listeners and push updates as are required by the app. Push updates are optimized to only be sent to specific clients that are interested. For example if a collection item is added to a collection only clients that are currently viewing the same collection items will receive a push update.

On the server push updates are implemented via the standard Java Web Socket API in the Copilot persistency container. This allows the backend implementation to instantaneously push updates directly to interested clients when data changes. Updates from the server to the client contain a minimal payload of metadata that allows the client to choose how to present the update to the user, such as immediately requesting the new data via OData, or presenting the user with a message or button to perform the update.

The user can perform full text search on Copilot collection content. This is achieved by enabling search in the corresponding HANA tables. The Copilot UI sends the search string to the copilot backend service, which retrieves search results by calling HANA stored procedure. The backend service provides a function that sends the response back to the client with the resulting entities along with its related entities for consumption on the Copilot UI.

Figure 10:
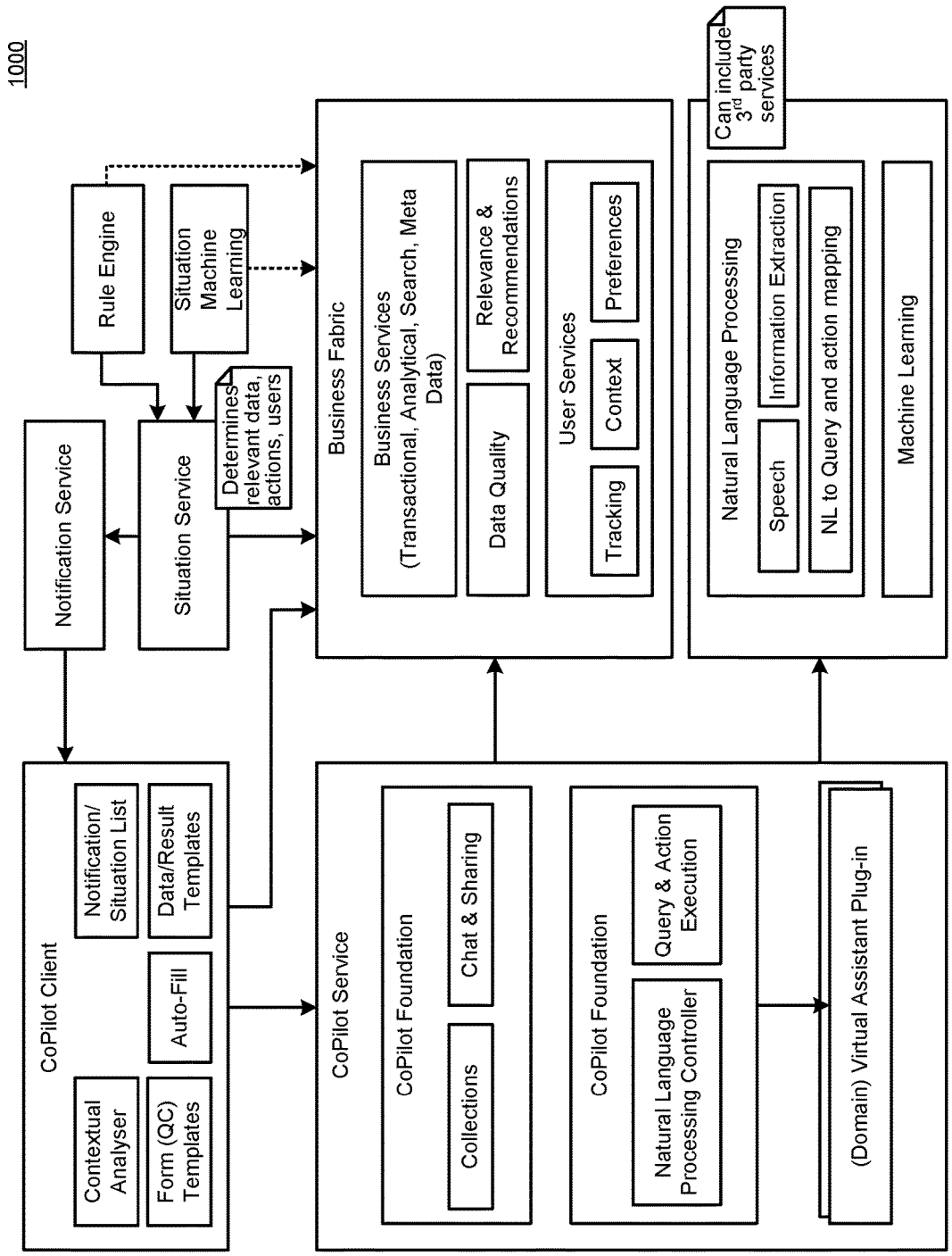
FIG. 10 is an example block diagram for CoPilot natural language processing (NLP).
Figure 10:
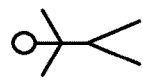

Referring to FIG. 10, an example block diagram for CoPilot natural language processing (NLP) system 1000 is illustrated. The NLP system 1000 enables one or more of the following features for CoPilot:

Voice Processing: Speech to Text and Text to Speech

Dynamic Add-on Dictionaries: Business domain vocabularies, named entities (large number, e.g. business partners, products, people, . . . )

Natural Language to Query/Action Mapping: potentially complex query parameter capabilities Conversational Context: usability and natural interaction for more complex use cases, step-by-step refinement; system requesting missing information Data Quality and Normalization Information Extraction: entity relationships, attribute values Intent Analysis: to recommend actions, relevant information, contributors based on the context Language Modeling: easy, intuitive modeling required to scale use cases General NLP qualities: accuracy, tolerance for misspellings and variants, multi-language support, etc.

Figure 11A:
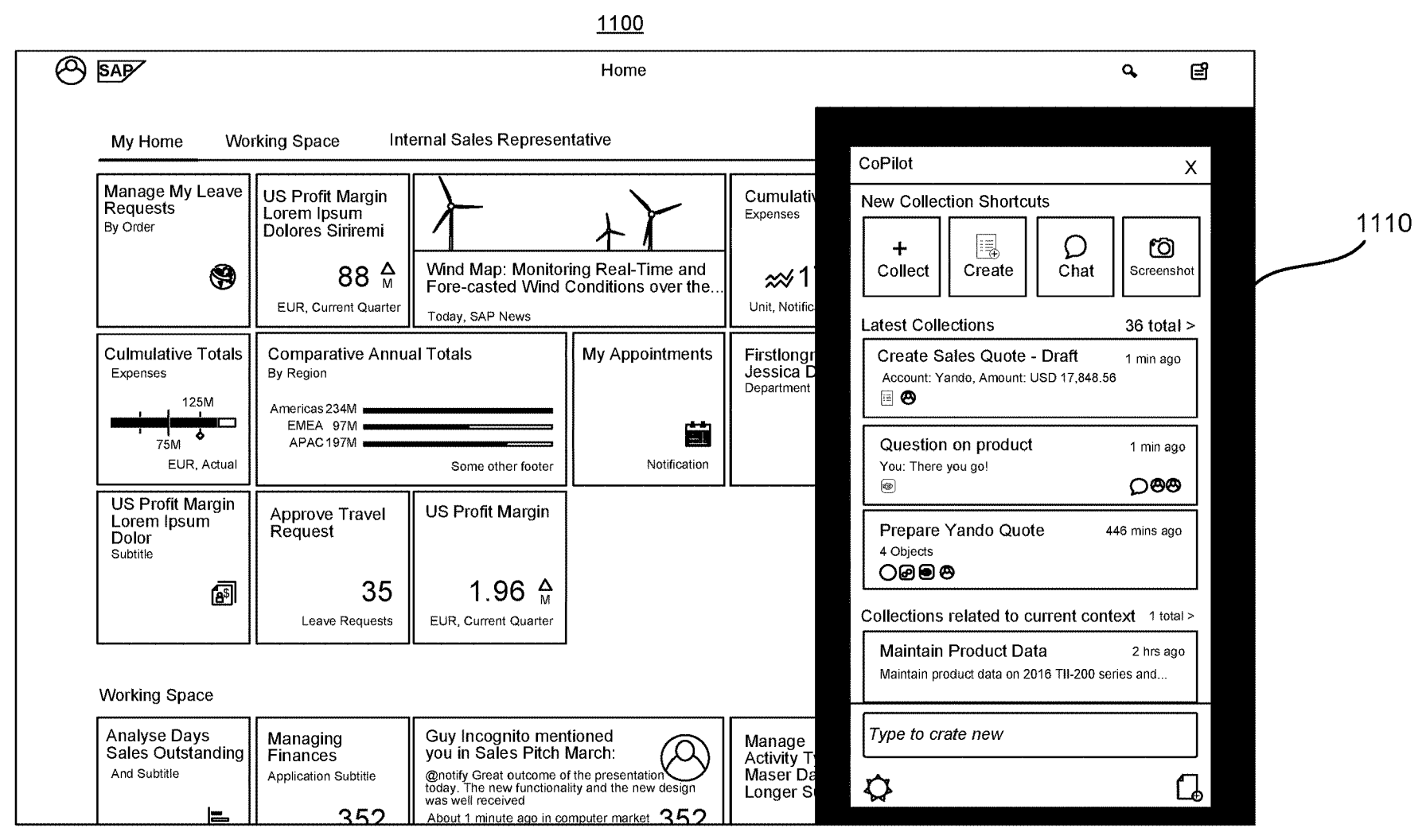
Figure 11B:
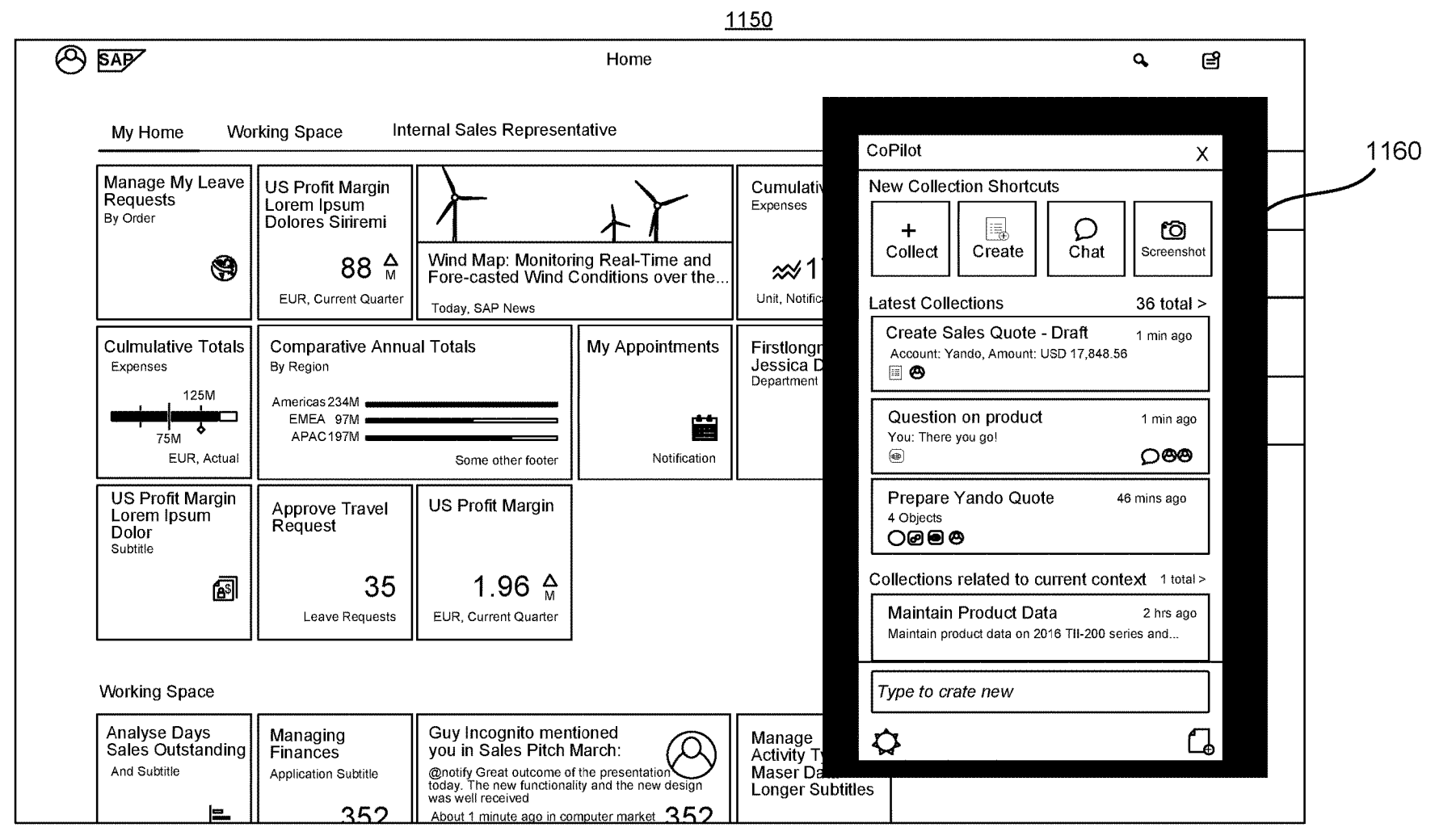

Referring to FIG. 11A, an example screen shot 1100 illustrates an example CoPilot window 1110 as a docked window. Referring to FIG. 11B, an example screen shot 1150 illustrates an example CoPilot 1160 window as a floating window.

The floating window 1160 is a container used to extend and enrich the functionality of all apps in the Fiori environment in a loosely coupled way. This cross functionality is not limited to a certain single app or content screen, but is provided throughout all app screens in the Fiori environment and thereby can connect different apps. It provides a way to add functionality to a screen without having to integrate it in the layout of the actual content. The functionality provided inside the container is accessible from every screen and can be used across multiple apps and screens. The container has to part of the shell, as it needs to be omnipresent across apps and Launchpad.

Some high level behaviors of the floating window 1160 include that it is triggered from Shell-Icon, floats above standard content, and is height flexible, width fixed (S size). The structure includes a header (For Navigation, etc.), a content area and a footer (Actions). The floating window 1160 is movable (Drag and Drop) and includes different display modes such as floating, expanded or collapsed mode and docked or un-docked from full screen (Left or Right anchor positions depending on user dragging interactions). The floating window 1160 always keeps its position when content is being scrolled and is context aware (Knows the app that is displayed behind the Copilot window and all related business case and user contexts/roles). The floating window 1160 is a drop target meaning the Copilot window remembers the user's last dragged position on any screen (Sticky) and is fully responsive across all devices and screen sizes.

The CoPilot windows 1110 and 1160 include the following structure features and functions. The windows 1110 and 1160 include a header having buttons and controls: Close, Expand/Collapse, Back and other Navigations, Selectable UI elements such as text, Actions, Options, etc. The windows include a content area (flexible height) and a footer (fixed height). For its visual focus structure, the Copilot widow 1110 and 1160 is displayed in a "Front Focus" visual aspect such popups, etc.

The CoPilot windows 1110 and 1160 may be implemented on mobile and other device display structures (Desktop/Tablet/Smartphone/Smartwatch) of all sizes according to responsive/adaptive display behaviors for tablet, smartphone and smartwatches. The content area is flexible in size, behavior, and adding additional containers of any type (Smart Templates, filters, growing text containers, Chat Bar, etc.).

The Copilot windows 1110 and 1160 enable to following container user interactions including automatically launch Copilot from content (e.g. making suggestions to user on how to proceed on a certain action) and closing or launching the copilot window at any time and any entered content is automatically saved without the need for any popups and other user actions. Interactions include non-modal interactions that automatically close the Copilot window upon certain selections such as close Copilot window via "X" button in Header.

For Copilot window size and layering and modes the width of the floating window may be fixed (S). On devices with smaller width than the standard S size, the floating window size will adjust accordingly and the contained controls will adjust respectively to their responsive features. The height is flexible, with min, max and start values. The max=Height of browser window-Fiori shell, the min=Phone height-Fiori shell, the start=Property (in between Min & max). One exception for the height is the collapsed state. The floating window is used to provide functionality across all apps and screens. Therefore, it needs to float above all regular content (including modal dialogs). The only controls/concepts that should be on a higher index level then the floating window are the notifications banners, settings, shell, hierarchical navigation, Me Area, and help.

The following are the CoPilot window modes: Floating 1160 (default) with the floating window not movable outside of the content area, Floating Collapsed—only displays the header of the floating window and removes the navigation except for containing a Close button/icon, expand button, and Title Text with optional navigation, and Docked 111. In contrast to the other states, the docked state does not overlap the screen content under the Copilot window and can be docked on either the right or left side of the screen when dragged there. To save screen space for displaying content, the window may be of a reduced width. The height may always use the full height of the browser window less the height of the Fiori Shell. It is not possible to drag the window "off" the screen.

When the page is being scrolled and the floating window is open, the floating window will keep its position fixed, while the content below will scroll by. This is independent from the state the floating window currently has. While the floating window is closed, it may inform the user about existing floating window entries that where created in or have something to do with the current context. Therefore a small message bubble/window may be used. It may appear upon the page load. Message window contents may include a message text, (Button to directly trigger an action), a close icon, and a checkbox to prevent further message window/bubble. The Copilot Floating Window settings include Use Start Page (Switch On/Off). The start page is used to provide shortcuts and help out first time users. Well versed users might want to switch it off. Other setting include to start with last known state (Switch On/Off) and contextual messages (Switch On/Off). For keyboard operations, the floating window may be moved via arrow keys and floating window may be moved and docked via Tab keys or arrow+Alt keys.

Figure 12:
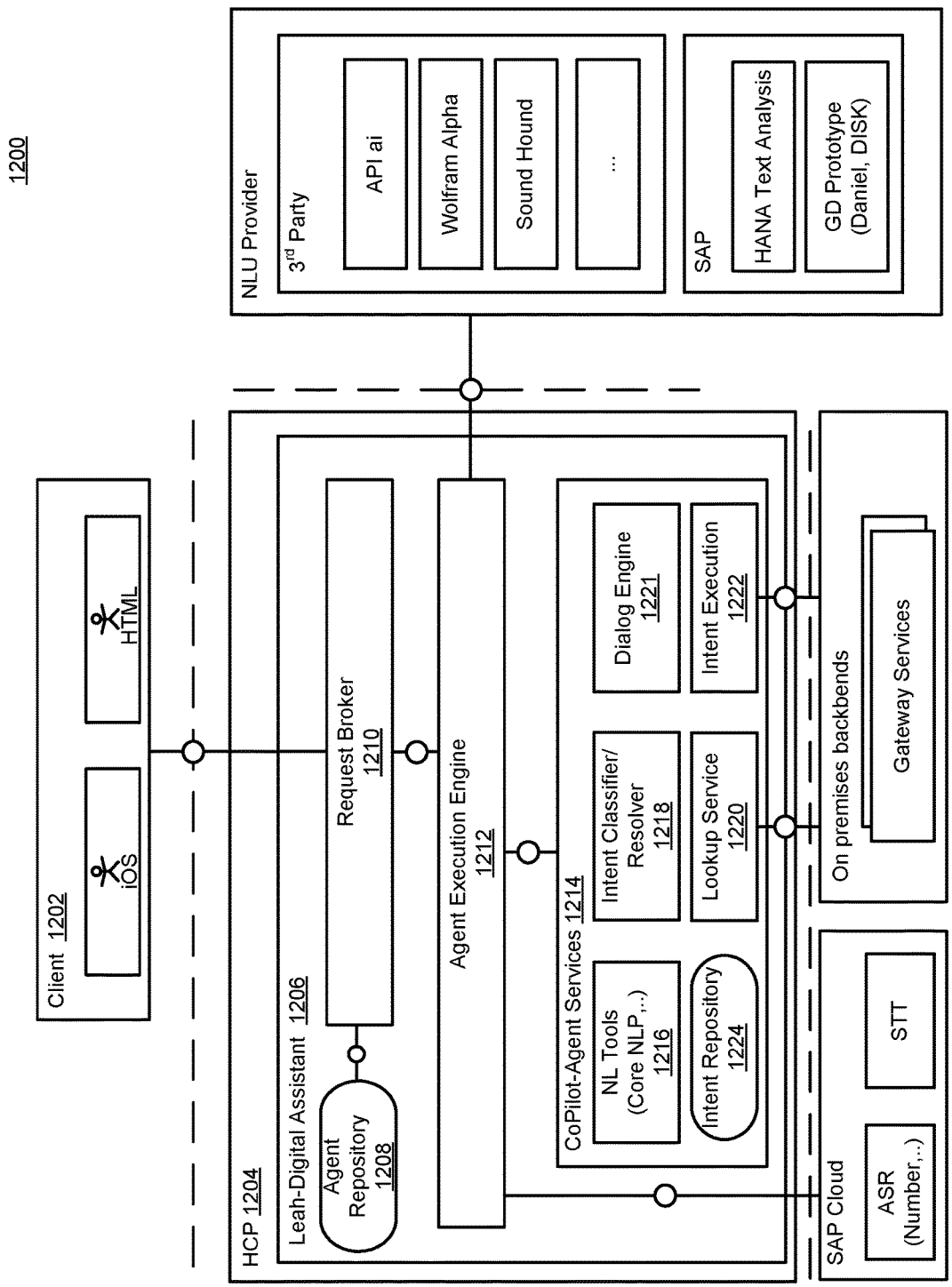
FIG. 12 is an example block diagram of an architecture illustrating CoPilot plugin extensibility.

Referring to FIG. 12, an example block diagram illustrates an architecture 1200 for CoPilot plugin extensibility. The architecture 1200 enables a client 1202 to communicate with a server such as, for example, HANA Cloud Platform (HCP) 1204. The HCP 1204 includes the Leah Digital Assistant 1206, which includes an agent repository 1208, a request broker 1210, an agent execution engine 1212 and CoPilot agent services 1214.

The request broker 1210 distributes the request to one or more agents based on the users role, domain or context of the request. The agent execution engine 1212 resolves speech to text (if necessary) and compares the results of agents based on confidence level and other metrics; returns the best match. The agent services 1214 include NLP Tools 1216: HANA TA tools, CoreNLP, Wordnet, etc. The agent services 1214 also includes an intent Classifier/Resolver 1218, which identifies an intent based on NLP output with the help of the Lookup Service 1220 and interfaces with a dialog engine 1221. The Lookup Service 1220 can match parameters and parameter values identified by NLP to an OData endpoint. The agent services 1214 includes an Intent Execution 1222, which can execute a resolved intent, which is either a CRUD operation, a function import call, or collection query with optional filter parameters. The intent repository 1224 is a registry for all provisioned intents.

FIG. 13 is a block diagram of a system 1300 for an integrated support interface across multiple different software applications. The system 1300 is configured to enable the CoPilot backend 1302 running on a platform such as the HANA Cloud Platform (HCP) to connect to and interact with multiple different software applications such as software applications 1304, 1306, 1308 and 1310. The CoPilot backend 1302 includes a support integration module 1312, which includes a context retrieval and management module 1314, a first support integration module 1316 and a second support integration module 1318. The CoPilot backend 1302 also includes an application connector 1320.

End users at a customer work with a variety of different software applications (e.g., SAP products), such as S4HANA 1304, Ariba, Fieldglass, Concur 1306, SuccessFactors Employee Central 1308 and other software applications 1310. These different software applications 1304-1310 each may include a connector interface 1322 to enable communications and coupling with the CoPilot backend 1302 through the application connector 1320.

The CoPilot user interface or integrated support interface runs on the front end such as on a browser or the users device and receives input from the end user. This received user input may include collection handling 1334 such as notes, screenshots and object references. The user input also may include virtual assistant and integrated help 1336, chat 1338, user activity tracking 1340 and notification handling 1342. Many of these components and inputs are described in other portions of this document. This information may be stored on the CoPilot backend 1302 and provide input to the support integration module 1312 to populate information for support tickets and to enable mapping of this information through the first support integration module 1316 and the second support integration module 1318.

The application connector component 1320 in the CoPilot backend 1302 shall allow applications or products to register and connect to CoPilot such as the software applications 1304-1310 through the connector interface 1322, which may be installed on each of the software applications 1304-1310.

The application connector 1320 provides applications 1304-1310 or products all information that is required to start the CoPilot UI for end users who are looking for help. It also allows applications 1304-1310 to provide CoPilot information to the content retrieval and management module 1314. The applications 1304-1310 provide the application context 1324, user context 1326 and system context 1328 that is required for CoPilot to offer dedicated help the user is looking for in the context of her work.

The end user may contact a key user or request help from the company-internal support organization. In this case, the end user won't contact a special person directly, but would rather approach the support organization responsible for the related topic. For this, CoPilot provides the first support integration module, also referred to as a Customer Support Integration component, which allows connecting to an internal support system 1330, also referred to as the Customer Support System. The first support integration module 1330 allows mapping of existing CoPilot chats and collections, which are from the integrated support user interface (i.e., CoPilot front end interface) to support tickets and allows the end user to chat with the Company-internal Support Agent who is processing the ticket.

The support organizations at the customer shall also be enabled to provide help documents and search capabilities for help documents and plug them into CoPilot so that those documents appear in CoPilot's integrated help whenever they fit to the application context 1324, user context 1326 or chat context. For this, the first support integration module 1330 provides a dedicated interface which allows customers to plug in document search and display services.

The Key User or the Company-internal Support Agent may come to the conclusion that the issue is related to a software problem and may create a ticket in an external support system 1332, which in this example may be the SAP Support System. For this, CoPilot uses the second support integration module 1318, also referred to as a SAP support integration module in this example, which allows connecting to the external support system 1332. If a support ticket needs to be created in the external support system 1332, then the key user can first review the existing chat content, screen shots and other content and deselect sensitive data or even blacken sensitive data of a screenshots that are to be sent together with the related application context, user context and system context is sent to the external support system 1332. The second support integration module 1318 does the mapping of existing CoPilot chats and collections to support tickets and also allows status updates of CoPilot chats and collections in case of status changes in the external support system 1332 and vice versa. The second support integration module 1318 also acts as a gateway for chats of end users with external resource support agents. The key user shall also be enabled to grant the external resource support agents access to the system for which the support is requested.

The system is also enabled to provide help documents and search capabilities for help documents and plug them into CoPilot so that those documents appear in CoPilot's integrated help whenever they fit to the application context, user context or chat context. For this, the second support integration module 1318 provides a dedicated interface which allows customers to plug in document search and display services.

Figure 14:
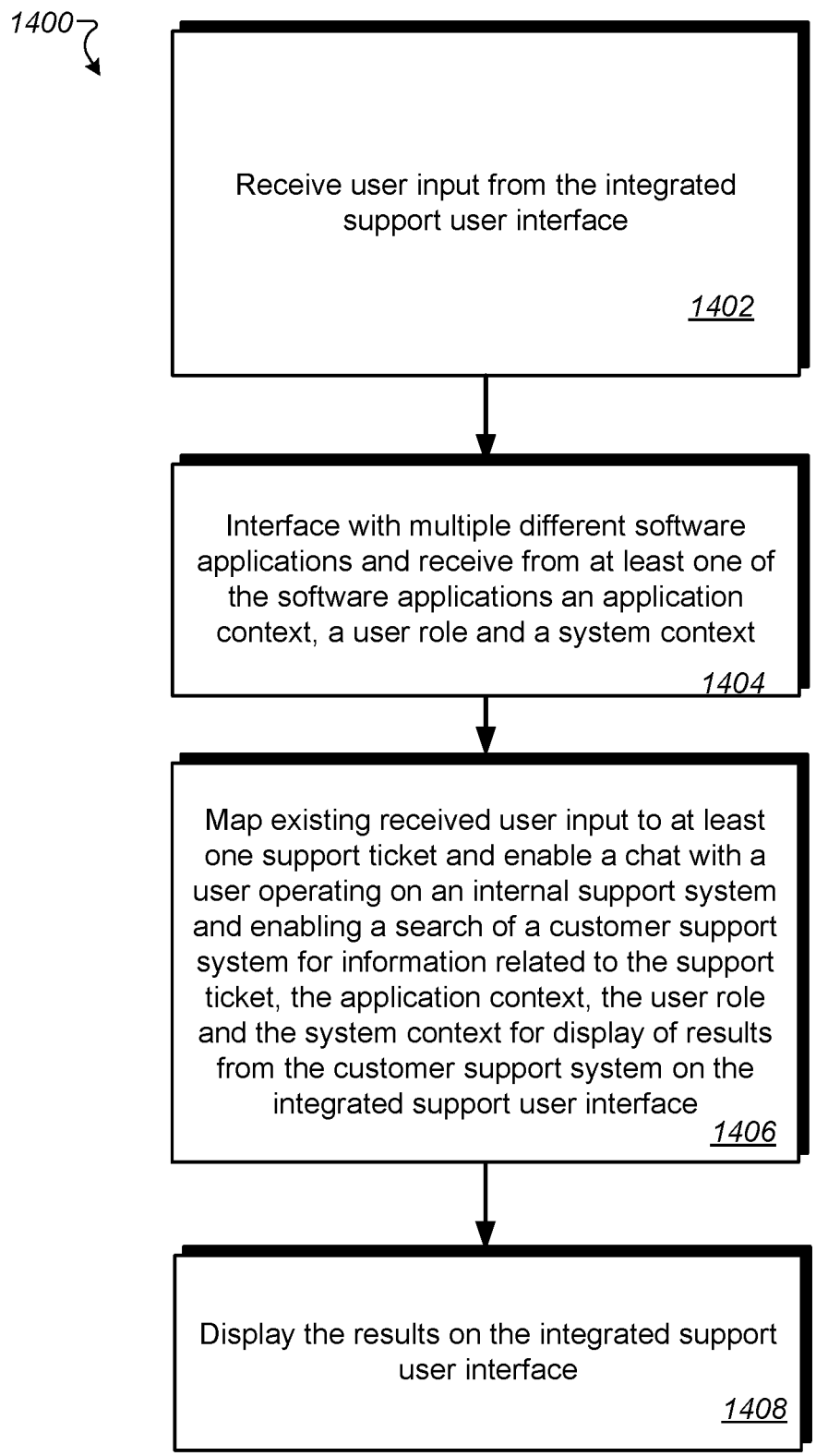
FIG. 14 is a flowchart illustrating example operations of the system of FIG. 13.

Referring to FIG. 14, an example process 1400 illustrates example operations of the system 1300 of FIG. 13. Process 1400 includes receiving user input from the integrated support user interface (1402). For example, the integrated support user interface (i.e., CoPilot) receives user input such as collection handling 1334, chat 1338, user activity tracking 1340 and other information.

Process 1400 includes interfacing with a plurality of multiple different software applications and receiving from at least one of the software applications an application context, a user role and a system context (1404). For example, the application connector 1320 interfaces with multiple different software applications 1304-1310 and receives from at least one of the applications information such as application context 1324, user context 1326 and system context 1328.

Process 1400 includes mapping existing received user input to at least one support ticket and enabling a chat with a user operating on an internal support system and enabling a search of a customer support system for information related to the support ticket, the application context, the user role and the system context for display of results from the customer support system on the integrated support user interface (1406). For example, first support integration module 1316 maps received user input and enables chat on an internal support system 1330 and enables a search of the internal support system (or customer support system) for eventual display on the integrated support user interface.

Process 1400 includes displaying the results on the integrated support user interface (1408). For example, the CoPilot backend 1302 enables display of the results on the CoPilot front end user interface.

Aspects of the system 1300 of FIG. 13 and the process 1400 of FIG. 14 includes the following advantages, features and functionality. For example, contextual information regarding an application may be transmitted, conveyed, etc. to the CoPilot backend 1302. Such information may be used to offer, recommend, etc. links or references to relevant documents, notes, blog entries, social media, etc. The CoPilot backend 1302 may retrieve aspects of the above from internal 1330 and/or external support systems 1332, document management systems, corporate portals, corporate repositories, etc. The CoPilot backend 1302 may support the use of any number of 'bots' for among other things the collection, gathering, etc. of information. Such bots may be flexible, extensible, and dynamically configurable. Such bots may employ any number of APIs, protocols, etc. The CoPilot backend 1302 allows support requests to be seamlessly initiated inside or within a customer's organization thus improving the efficiency (ease of creation, timeliness, the automatic capture of contextual details, etc.) of such requests.

The CoPilot backend 1302 may function as something of a single, consolidated frontend to a distributed back-end infrastructure which supports among other things the seamless integration of for example customer support systems, document management systems, etc. The CoPilot backend 1302 may offer aspects of its functionality through one or more lightweight plug-in mechanisms. Aspects of the above may leverage any number of internal and/or external resources including among other things knowledge bases, corporate repositories, social media platforms, etc. Aspects of the above may be extended, through as just one example a white-label initiative, to support other (e.g., non-SAP) solutions, in corporate or business settings but also in any number of private non-business settings.

The CoPilot backend 1302 is among other things responsive, flexible, and extensible. During any portion of its lifetime the CoPilot backend 1302 may present to a user any number of hints, tips, suggestions, help material, etc. which may be any combination of specific (e.g., context sensitive)

or general. Based on a user's interaction with the integrated support user interface any number of algorithms, logic, rules, workflows, state diagrams, etc. may be triggered, applied, invoked, etc.

While the CoPilot backend 1302 facility may improve, augment, etc. significantly aspects of a Fiori environment, such a facility is not limited to just a Fiori environment and may operate, function, etc. in any number of other environments such as for example standalone, in association with a system, etc.

Aspects of the CoPilot backend 1302 may reside, operate, etc. within a user interface on any target device including for example any combination of one or more of inter alia a desktop, a notebook, a tablet, a smart phone, a smart watch, etc. and may among other things dynamically adjust or adapt aspects of itself to account for any particulars (e.g., display real estate, input mechanism(s), etc.) of a target device.

In a mobile context aspects of the CoPilot backend 1302 may reside in any number of environments, contexts, etc. including for example any combination of one or more of web-based, native, hybrid, containerized, etc.

The following interactive user scenario provides an end user usage context scenario involving the system 1300 of FIG. 13 and the process 1400 of FIG. 14. Emma is a Budget Controller at Acme Corp. and a SAP user. She notices a negative budget and wants to confirm if it is justified. After checking for business reasons and not being able to solve the issue she decides to open the assistance option in CoPilot.

A chatbot within CoPilot greets Emma and offers context-specific information (e.g. tutorials, documentation, community content, videos etc.). The information CoPilot displays is depending on Emma's current screen, tracing information (e.g. error codes, etc.), and her usage history.

With the help of the documents displayed, Emma understands that the budget overrun is not justified. She signals that she needs further help. CoPilot suggests to add an expert (Eddie, single person or group of people at SSC) to the conversation, Emma agrees.

CoPilot guides Emma to gather relevant information that will help the Key User (Eddie) to understand the issue, e.g. screen shots and a simple description of the issue. In addition, CoPilot automatically adds all the context available into the conversation (information about the running app, loaded business data, navigation steps).

Eddie accepts the chat invitation. Via CoPilot, Eddie has access to all information related to the issue shared by Emma. If needed Eddie can use CoPilot to chat with Emma and collect more relevant information.

Eddie decides to open the application in that the issue occurred via the screenshot Emma provided. CoPilot knows Eddie's authorization to offer system access to the app. The information in the app is prefilled with data that CoPilot gathered from Emma in order to help to Eddie reproduce the issue. CoPilot offers access to relevant KBA, Notes and Communities (expert access) to support solving the issue.

Since Eddie is not able to find a solution, he decides to start a chat with the SAP support via CoPilot. Before sending the chat request, Eddie reviews the collected data decides what to share. For sensitive data CoPilot offers an option anonymize the data Eddie selects the information.

Sophie works for SAP support and receives the chat notification from Eddie. She reads through the CoPilot collection Eddie shared.

To get access to the Acme Corp. system Sophie can send a request to Eddie. To get further input to resolve the issue she can directly chat with Eddie.

Sophie creates an IT ticket in BCP for the issue via the CoPilot quick create. The ticket is connected to the respective CoPilot collection and relevant information transmitted automatically from CoPilot to BCP.

Emma and Eddie automatically receive updates in CoPilot on the processing status of the IT ticket. As soon Sophie resolves the issue the proposed solution is pushed to Emma and Eddie.

Emma and Eddie are pleased with the solution. Eddie happily fills in the feedback survey CoPilot asks him to complete.

CoPilot stores the conversation together with the context of the issue and the provided solution to learn from it and propose appropriate solutions in the future. Based on the solution Eddie can create further knowledge documents that might help End Users to solve similar issue more easily and include them in CoPilot.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for an integrated support interface across multiple different software applications, the system comprising:
   at least one memory including instructions; and
   at least one processor that is operably coupled to the at least one memory and that is arranged and configured to execute the instructions that, when executed, cause the at least one processor to implement an integrated support user interface, an application connector, and a first support integration module wherein:
      the integrated support user interface includes received user input;
      the application connector is configured to interface with a plurality of multiple different software applications and to receive, from at least one of the software applications, an application context, a user role, and a system context;
      the first support integration module is configured to map existing received user input to at least one support ticket and to enable a chat with a user operating on an internal support system and to enable a search of a customer support system for information related to the at least one support ticket, the application context, the user role and the system context for display of results from the customer support system on the integrated support user interface; and
      the integrated support user interface is configured to display the results.

2. The system of claim 1 further comprising instructions that, when executed, cause the at least one processor to implement a second support integration module that is configured to connect to an external support system that differs from the internal support system and to map the at least one support ticket and the chat with the user operating on the internal support system to the external support system.

3. The system of claim 1 wherein the application connector is configured to enable the plurality of multiple different software applications to register with and connect to the integrated support user interface.

4. The system of claim 3 wherein the integrated support user interface comprises a floating window that hovers over a window for the at least one of the software applications.

5. The system of claim 2 wherein the second support integration module is configured to receive user input to deselect information from the at least one support ticket prior to mapping the at least one support ticket to the external support system.

6. The system of claim 1 wherein the plurality of multiple different software applications are all being run by a same end user.

7. The system of claim 1 wherein the user input comprises a collection data structure, containing one or more items, from a set of collection data structures.

8. The system of claim 1 wherein the user input further includes chats.

9. A computer-implemented method for an integrated support interface across multiple different software applications including executing instructions stored on a non-transitory computer-readable storage medium, the method comprising:
   receiving user input from the integrated support user interface;
   interfacing with a plurality of multiple different software applications and receiving, from at least one of the software applications, an application context, a user role, and a system context;
   mapping existing received user input to at least one support ticket and enabling a chat with a user operating on an internal support system and enabling a search of a customer support system for information related to the at least one support ticket, the application context, the user role and the system context for display of results from the customer support system on the integrated support user interface;
   connecting to an external support system that is separate from the internal support system and mapping the at least one support ticket and the chat with the user operating on the internal support system to the external support system; and
   displaying the results on the integrated support user interface.

10. The method as in claim 9 further comprising enabling the plurality of multiple different software applications to register with and connect to the integrated support user interface.

11. The method as in claim 10 wherein the integrated support user interface comprises a floating window that hovers over a window for the at least one of the software applications.

12. The method as in claim 9 further comprising receiving user input to deselect information from the at least one support ticket prior to mapping the at least one support ticket to the external support system.

13. The method as in claim 9 wherein the plurality of multiple different software applications are all being run by a same end user.

14. The method as in claim 9 wherein the user input comprises a collection data structure, containing one or more items, from a set of collection data structures.

15. The method as in claim 9 wherein the user input further includes chats.

16. A computer program for an integrated support interface across multiple different software applications, the computer program product being tangibly embodied on a non-transitory computer-readable storage medium and comprising instructions that, when executed by at least one computing device, are configured to cause the at least one computing device to:

receive user input from the integrated support user interface;

interface with a plurality of multiple different software applications and receive, from at least one of the software applications, an application context, a user role and a system context;

map existing received user input to at least one support ticket and enable a chat with a user operating on an internal support system and enable a search of a customer support system for information related to the at least one support ticket, the application context, the user role and the system context for display of results from the customer support system on the integrated support user interface;

connect to an external support system that is separate from the internal support system and map the at least one support ticket and the chat with the user operating on the internal support system to the external support system; and display the results on the integrated support user interface.

17. The computer program product of claim 16 wherein the integrated support user interface comprises a floating window that hovers over a window for the at least one of the software applications.

18. The computer program product of claim 16 further comprising instructions that, when executed, cause the at least one computing device to receive user input to deselect information from the at least one support ticket prior to mapping the at least one support ticket to the external support system.

* * * * *